(12) United States Patent
Chung et al.

(10) Patent No.: US 9,894,591 B2
(45) Date of Patent: Feb. 13, 2018

(54) APPARATUS AND METHOD FOR PROVIDING DEVICE-TO-DEVICE COMMUNICATION-BASED SERVICE FOR ISOLATED USER EQUIPMENT IN MOBILE COMMUNICATION SYSTEM

(71) Applicants: Samsung Electronics Co., Ltd., Suwon-si, Gyeonggi-do (KR); RESEARCH & BUSINESS FOUNDATION SUNGKYUNKWAN UNIVERSITY, Suwon-si, Gyeonggi-do (KR)

(72) Inventors: Min Young Chung, Seoul (KR); Seung-Hoon Park, Seoul (KR); Dong-Hyun Kim, Suwon-si (KR); Dae-Gyun Kim, Seongnam-si (KR); Hyun-Seok Ryu, Yongin-si (KR); Sueng-Jae Bae, Suwon-si (KR); Chi-Woo Lim, Suwon-si (KR)

(73) Assignees: Samsung Electronics Co., Ltd., Suwon-si (KR); Research & Business Foundation Sungkyunkwan University, Suwon-si (KR)

( * ) Notice: Subject to any disclaimer, the term of this patent is extended or adjusted under 35 U.S.C. 154(b) by 0 days.

(21) Appl. No.: 14/913,656

(22) PCT Filed: Aug. 22, 2014

(86) PCT No.: PCT/KR2014/007833
§ 371 (c)(1),
(2) Date: Feb. 22, 2016

(87) PCT Pub. No.: WO2015/026200
PCT Pub. Date: Feb. 26, 2015

(65) Prior Publication Data
US 2016/0212682 A1 Jul. 21, 2016

(30) Foreign Application Priority Data

Aug. 22, 2013 (KR) .................. 10-2013-0099814

(51) Int. Cl.
*H04W 40/22* (2009.01)
*H04W 76/02* (2009.01)
(Continued)

(52) U.S. Cl.
CPC .......... *H04W 40/22* (2013.01); *H04W 12/06* (2013.01); *H04W 48/16* (2013.01); *H04W 72/04* (2013.01);
(Continued)

(58) Field of Classification Search
CPC ..... H04W 12/06; H04W 36/08; H04W 40/22; H04W 48/16; H04W 72/04; H04W 76/023; H04W 88/04; H04W 8/005
(Continued)

(56) References Cited

U.S. PATENT DOCUMENTS 8,948,770 B2* 2/2015 Du ................ H04W 76/043
455/443
9,002,281 B2* 4/2015 Fwu ................ H04W 72/02
370/328
(Continued)

FOREIGN PATENT DOCUMENTS

KR 10-2005-0101692 A 10/2005
KR 10-2012-0074255 A 7/2012
(Continued)

OTHER PUBLICATIONS

3GPP TR 22.803, Technical Specification Group Services and System Aspects; Feasibility study for Proximity Services (ProSe) (Release 12), V12.1.0, Mar. 2013.
(Continued)

*Primary Examiner* — Babar Sarwar
(74) *Attorney, Agent, or Firm* — Jefferson IP Law, LLP

(57) ABSTRACT

The present disclosure relates to a pre-5th-generation (5G) or 5G communication system to be provided for supporting
(Continued)

higher data rates beyond 4th-generation (4G) communication system such as a long term evolution (LTE).

A method for providing a device-to-device (D2D) communication-based service for an isolated user equipment (IUE) by a relay user equipment (RUE) in a mobile communication system is provided. The method includes establishing a D2D link with an IUE; and supporting establishment of a relay cellular link for the IUE based on the established D2D link, wherein the RUE is within a service coverage of an enhanced node B (eNB).

20 Claims, 28 Drawing Sheets

(51) Int. Cl.
| | | |
|---|---|---|
| *H04W 12/06* | (2009.01) | |
| *H04W 48/16* | (2009.01) | |
| *H04W 72/04* | (2009.01) | |
| *H04W 88/04* | (2009.01) | |
| *H04W 8/00* | (2009.01) | |
| *H04W 36/08* | (2009.01) | |

(52) U.S. Cl.
CPC .......... *H04W 76/023* (2013.01); *H04W 8/005* (2013.01); *H04W 36/08* (2013.01); *H04W 88/04* (2013.01)

(58) Field of Classification Search
USPC ...... 455/404.2, 11.1, 411, 412.1–414.2, 410, 455/418–422.1, 435.2, 444, 456.1, 552.1, 455/550.1, 457, 41.1–41.2; 370/328–332, 370/338
See application file for complete search history.

(56) References Cited

U.S. PATENT DOCUMENTS

| | | | | |
|---|---|---|---|---|
| 2005/0232212 A1* | 10/2005 | Kang | ................ | H04W 36/0061 370/338 |
| 2006/0114850 A1* | 6/2006 | Avinash | ................ | H04W 40/22 370/328 |
| 2006/0267841 A1* | 11/2006 | Lee | ................ | G01S 5/0081 342/463 |
| 2010/0009675 A1* | 1/2010 | Wijting | ................ | H04W 76/023 455/426.1 |
| 2010/0261469 A1* | 10/2010 | Ribeiro | ................ | H04W 99/00 455/423 |
| 2012/0079019 A1* | 3/2012 | Miettinen | ................ | G06Q 50/00 709/204 |
| 2012/0179789 A1* | 7/2012 | Griot | ................ | H04W 12/08 709/220 |
| 2013/0231088 A1* | 9/2013 | Jabara | ................ | G06Q 10/101 455/411 |
| 2013/0308598 A1* | 11/2013 | Madan | ................ | H04W 36/18 370/331 |
| 2013/0322388 A1* | 12/2013 | Ahn | ................ | H04W 76/023 370/329 |
| 2014/0064203 A1 | 3/2014 | Seo et al. | | |
| 2014/0357228 A1* | 12/2014 | Luft | ................ | H04B 7/0456 455/411 |
| 2015/0094064 A1* | 4/2015 | Lei | ................ | H04W 76/023 455/436 |
| 2015/0133112 A1* | 5/2015 | Wang | ................ | H04W 76/023 455/426.1 |
| 2015/0271856 A1* | 9/2015 | Tong | ................ | H04W 16/26 455/426.1 |
| 2015/0282234 A1* | 10/2015 | Sartori | ................ | H04W 76/023 370/329 |
| 2016/0100303 A1* | 4/2016 | Kim | ................ | H04W 76/02 455/426.1 |
| 2017/0164188 A1* | 6/2017 | Choi | ................ | H04L 67/104 |

FOREIGN PATENT DOCUMENTS

| | | |
|---|---|---|
| KR | 10-2013-0065357 A | 6/2013 |
| WO | 10/007498 A1 | 1/2010 |
| WO | 2012-128505 A2 | 9/2012 |

OTHER PUBLICATIONS

3GPP TS, Technical Specification Group Radio Access Network; Evolved Universal Terrestrial Radio Access (E-UTRA) and Evolved Universal Terrestrial Radio Access Network (E-UTRAN); Overall description; Stage 2 (Release 11), Mar. 2013.

3GPP TS, Technical Specification Group Services and System Aspects; General Packet Radio Service (GPRS) enhancements for Evolved Universal Terrestrial Radio Access Network (E-UTRAN) access (Release 12), Mar. 2013.

3GPP TR 36.331, Technical Specification Group Radio Access Network; Evolved Universal Terrestrial Radio Access (E-UTRA); Radio Resource Control (RRC); Protocol specification (Release 11), Mar. 2013.

3GPP TS 36.413, Technical Specification Group Radio Access Network; Evolved Universal Terrestrial Radio Access Network (E-UTRAN); S1 Application Protocol (S1AP) (Release 11), Mar. 2013.

3GPP TS, Technical Specification Group Radio Access Network; Evolved Universal Terrestrial Radio Access Network (E-UTRAN); X2 application protocol (X2AP) (Release 11), Mar. 2013.

\* cited by examiner

APPARATUS AND METHOD FOR PROVIDING DEVICE-TO-DEVICE COMMUNICATION-BASED SERVICE FOR ISOLATED USER EQUIPMENT IN MOBILE COMMUNICATION SYSTEM

CROSS-REFERENCE TO RELATED APPLICATION(S)

This application is a U.S. National Stage application under 35 U.S.C. § 371 of an International application filed on Aug. 22, 2014 and assigned application number PCT/KR2014/007833, which claimed the benefit of a Korean patent application filed on Aug. 22, 2013 in the Korean Intellectual Property Office and assigned Serial number 10-2013-0099814, the entire disclosure of which is hereby incorporated by reference.

TECHNICAL FIELD

The present disclosure relates to an apparatus and method for providing a device-to-device (D2D) communication-based service for an isolated user equipment (IUE) in a mobile communication system.

BACKGROUND

To meet the demand for wireless data traffic, which has increased since deployment of 4th-generation (4G) communication systems, efforts have been made to develop an improved 5th-generation (5G) or pre-5G communication system. Therefore, the 5G or pre-5G communication system is also called a 'beyond 4G network' or a 'post long-term evolution (LTE) system'.

It is considered that the 5G communication system will be implemented in millimeter wave (mmWave) bands, e.g., 60 GHz bands, so as to accomplish higher data rates. To reduce propagation loss of radio waves and increase a transmission distance, a beam forming technique, a massive multiple-input multiple-output (MIMO) technique, a full dimensional MIMO (FD-MIMO) technique, an array antenna technique, an analog beam forming technique, and a large scale antenna technique are discussed in 5G communication systems.

In addition, in 5G communication systems, development for system network improvement is under way based on advanced small cells, cloud radio access networks (RANs), ultra-dense networks, a D2D communication, a wireless backhaul, a moving network, a cooperative communication, coordinated multi-points (CoMP), reception-end interference cancellation, and the like.

In the 5G system, a hybrid frequency shift keying (FSK) and quadrature amplitude modulation (QAM) modulation (FQAM) and a sliding window superposition coding (SWSC) as an advanced coding modulation (ACM) scheme, and a filter bank multi carrier (FBMC) scheme, a non-orthogonal multiple Access (NOMA) scheme, and a sparse code multiple access (SCMA) scheme as an advanced access technology have been developed.

Generally, in a D2D communication system, a device identifies neighbor devices which are proximate to the device itself, and transmits and receives data by establishing a radio link with a specific neighbor device if necessary. This process for establishing a radio link and transmitting and receiving data is locally performed among devices without assistance of additional apparatus, so a D2D communication system has an advantage that rapid market introduction is possible without additional infrastructure compared to other wireless communication system. Further, a D2D communication system may solve a traffic overload problem which is concentrated on a base station or an access point (AP) by locally accepting data traffic.

So, a standard organization such as a 3rd generation partnership project (3GPP), and a institute of electrical and electronics engineers (IEEE) has standardized a D2D communication standard based on long-term evolution advanced (LTE-A), wireless-fidelity (Wi-Fi), and/or the like, and various D2D communication schemes have been developed. Recently, a 3GPP has actively progressed a standardization study for supporting a proximity service among devices. Specially, a D2D communication scheme which may increase a data rate between neighbor devices and may decrease transmission delay between the neighbor devices has been considered as a scheme which is appropriated for supporting the proximity service among the devices.

Meanwhile, a 3GPP uses a relay node (RN) in order to increase network capacity of a long term evolution (LTE) system and extend a service coverage.

A structure of a general LTE mobile communication system including an RN will be described with reference to FIG. 1.

FIG. 1 schematically illustrates a structure of a general LTE mobile communication system including an RN.

Referring to FIG. 1, the LTE mobile communication system includes an evolved packet core (EPC) 110 and an enhanced-universal terrestrial radio access network (E-UTRAN) 120. The EPC 110 includes an mobile management entity (MME)/serving-gateway (S-GW) 111, and an MME/S-GW 113, and the E-UTRAN 120 includes an enhanced node B (eNB) 115, a donor eNB (DeNB) 117, and an RN 119.

The RN 119 relays a control signal and data traffic between the LTE mobile communication system and a user equipment (UE) by connecting a backhaul link with the LTE mobile communication system using a Un interface as a radio interface.

The DeNB 117 is an eNB which supports relay communication of the RN 119, supports a network access of the RN 119, and modifies a communication parameter of the RN 119 by periodically or a periodically transmitting a control signal.

The EPC 110 performs an authenticating operation for the RN 119, and performs an operation for providing parameters used for communication of the RN 119, and the like.

In an LTE mobile system, an RN is deployed within a service coverage of a cell or at a boundary of a service coverage of a cell, and supports communication for a UE which exists at a hot-spot area, a shadow area, and a cell boundary area. However, an RN is generally deployed at a fixed location, so the RN is difficult to support communication for a shadow area which may fluidly occur.

Further, an RN is additionally deployed and operated by a service provider, so deployment and operating cost is relatively expensive. Specially, if an eNB or an RN at a specific area does not perform a normal function due to occurrence of a disaster, UEs which exist at the specific area may not perform normal communication.

So, in an LTE mobile communication system, there is a need for a scheme for providing normal communication for UEs which exist at a disaster area, a shadow area, a cell boundary area, and the like.

The above information is presented as background information only to assist with an understanding of the present disclosure. No determination has been made, and no assertion is made, as to whether any of the above might be applicable as prior art with regard to the present disclosure.

SUMMARY

An embodiment of the present disclosure proposes an apparatus and method for providing a D2D communication-based service for an IUE in a mobile communication system.

An embodiment of the present disclosure proposes an apparatus and method for providing a D2D communication-based service to an IUE which exists at outside of a service coverage of an eNB in a mobile communication system by establishing a link appropriate for a situation. In accordance with an aspect of the present disclosure, a method for providing a device-to-device (D2D) communication-based service for an isolated user equipment (IUE) by a relay user equipment (RUE) in a mobile communication system is provided. The method includes establishing a D2D link with an IUE; and supporting establishment of a relay cellular link for the IUE based on the established D2D link, wherein the RUE is within a service coverage of an enhanced node B (eNB).

In accordance with another aspect of the present disclosure, a method for receiving a device-to-device (D2D) communication-based service by an isolated user equipment (IUE) in a mobile communication system is provided. The method includes establishing a D2D link with a relay user equipment (RUE) which is within a service coverage of an enhanced node B (eNB); and transmitting a D2D discovery message to candidate RUEs which exist around the IUE if authentication for the D2D communication is requested in the mobile communication system.

In accordance with another aspect of the present disclosure, a method for providing a device-to-device (D2D) communication-based service for an isolated user equipment (IUE) by an enhanced node B (eNB) in a mobile communication system is provided. The method includes receiving a message indicating request for communication support for an IUE from each of candidate relay user equipments (RUEs) which determine to support relay communication for the IUE among candidate RUEs which exist around the IUE; and determining whether to support communication for the IUE based on capacity of the eNB and system configuration information.

In accordance with another aspect of the present disclosure, a method for receiving a device-to-device (D2D) communication-based service by an isolated user equipment (IUE) in a mobile communication system is provided. The method includes performing link change to a serving enhanced node B (SeNB) which is at the same cell or a relay user equipment (RUE) which is at the same cell according to change of a point of attachment (PoA); and performing a handover and link change to a target eNB (TeNB) upon moving into a service coverage of the TeNB different from the SeNB.

In accordance with another aspect of the present disclosure, a method for providing a device-to-device (D2D) communication-based service for an isolated user equipment (IUE) by a target enhanced node B (TeNB) in a mobile communication system is provided. The method includes detecting that a point of attachment (PoA) for an IUE is changed from a serving enhanced node B (SeNB) to a TeNB; and performing a handover and link change for the IUE.

In accordance with another aspect of the present disclosure, a relay user equipment (RUE) in a mobile communication system is provided. The RUE includes a transmitting unit; a receiving unit; and a control unit, wherein the control unit controls the transmitting unit and the receiving unit to establish a device-to-device (D2D) link with an isolated user equipment (IUE), and supports establishment of a relay cellular link for the IUE based on the established D2D link, and wherein the RUE is within a service coverage of an enhanced node B (eNB).

In accordance with another aspect of the present disclosure, an isolated user equipment (IUE) in a mobile communication system is provided. The IUE includes a transmitting unit; a receiving unit; and a control unit, wherein the control unit controls the transmitting unit and the receiving unit to establish a D2D link with a relay user equipment (RUE) which is within a service coverage of an enhanced node B (eNB), and the transmitting unit transmits a D2D discovery message to candidate RUEs which exist around the IUE if authentication for the D2D communication is requested in the mobile communication system.

In accordance with another aspect of the present disclosure, an enhanced node B (eNB) in a mobile communication system is provided. The eNB includes a receiving unit configured to receive a message indicating request for communication support for an IUE from each of candidate relay user equipments (RUEs) which determine to support relay communication for the IUE among candidate RUEs which exist around the IUE; and a control unit configured to determine whether to support communication for the IUE based on capacity of the eNB and system configuration information.

In accordance with another aspect of the present disclosure, an isolated user equipment (IUE) in a mobile communication system is provided. The IUE includes a transmitting unit; a receiving unit; and a control unit, wherein the control unit controls the transmitting unit and the receiving unit to perform link change to a serving enhanced node B (SeNB) which is at the same cell or a relay user equipment (RUE) which is at the same cell according to change of a point of attachment (PoA), and to perform a handover and link change to a target eNB (TeNB) when the IUE moves into a service coverage of the TeNB different from the SeNB.

In accordance with another aspect of the present disclosure, a target enhanced node B (TeNB) in a mobile communication system is provided. The TeNB includes a control unit configured to detect that a point of attachment (PoA) for an IUE is changed from a serving enhanced node B (SeNB) to a TeNB; and a transmitting unit and a receiving unit configured to perform a handover and link change for the IUE.

Other aspects, advantages, and salient features of the disclosure will become apparent to those skilled in the art from the following detailed description, which, taken in conjunction with the annexed drawings, discloses exemplary embodiments of the disclosure.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

The above and other aspects, features and advantages of certain exemplary embodiments of the present disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

Figure 1:
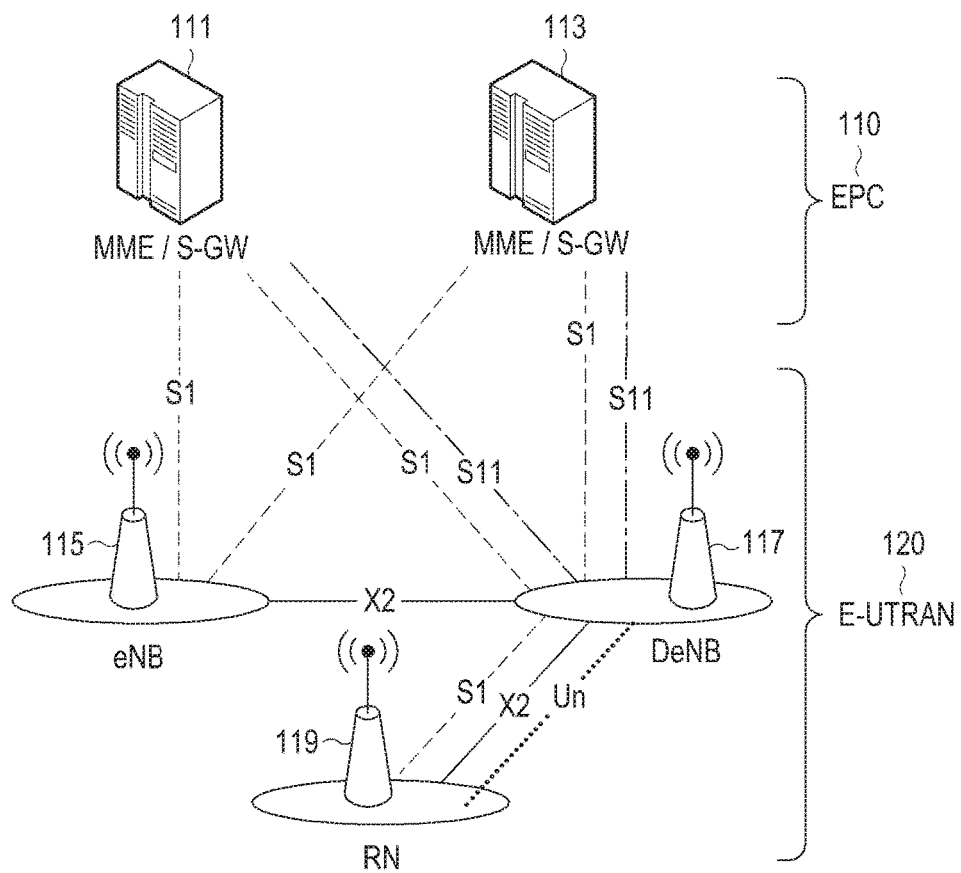
FIG. 1 schematically illustrates a structure of a general LTE mobile communication system including an RN.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Although ordinal numbers such as "first," "second," and so forth will be used to describe various components, those components are not limited herein. The terms are used only for distinguishing one component from another component. For example, a first component may be referred to as a second component and likewise, a second component may also be referred to as a first component, without departing from the teaching of the inventive concept. The term "and/or" used herein includes any and all combinations of one or more of the associated listed items.

The terminology used herein is for the purpose of describing various embodiments only and is not intended to be limiting. As used herein, the singular forms are intended to include the plural forms as well, unless the context clearly indicates otherwise. It will be further understood that the terms "comprises" and/or "has," when used in this specification, specify the presence of a stated feature, number, step, operation, component, element, or combination thereof, but do not preclude the presence or addition of one or more other features, numbers, steps, operations, components, elements, or combinations thereof.

The terms used herein, including technical and scientific terms, have the same meanings as terms that are generally understood by those skilled in the art, as long as the terms are not differently defined. It should be understood that terms defined in a generally-used dictionary have meanings coinciding with those of terms in the related technology.

According to various embodiments of the present disclosure, an electronic device may include communication functionality. For example, an electronic device may be a smart phone, a tablet personal computer (PC), a mobile phone, a video phone, an e-book reader, a desktop PC, a laptop PC, a netbook PC, a personal digital assistant (PDA), a portable multimedia player (PMP), an mp3 player, a mobile medical device, a camera, a wearable device (e.g., a head-mounted device (HMD), electronic clothes, electronic braces, an electronic necklace, an electronic appcessory, an electronic tattoo, or a smart watch), and/or the like.

According to various embodiments of the present disclosure, an electronic device may be a smart home appliance with communication functionality. A smart home appliance may be, for example, a television, a digital video disk (DVD) player, an audio, a refrigerator, an air conditioner, a vacuum cleaner, an oven, a microwave oven, a washer, a dryer, an air purifier, a set-top box, a TV box (e.g., Samsung HomeSync™, Apple TV™, or Google TV™), a gaming console, an electronic dictionary, an electronic key, a camcorder, an electronic picture frame, and/or the like.

According to various embodiments of the present disclosure, an electronic device may be a medical device (e.g., magnetic resonance angiography (MRA) device, a magnetic resonance imaging (MRI) device, computed tomography (CT) device, an imaging device, or an ultrasonic device), a navigation device, a global positioning system (GPS) receiver, an event data recorder (EDR), a flight data recorder (FDR), an automotive infotainment device, a naval electronic device (e.g., naval navigation device, gyroscope, or compass), an avionic electronic device, a security device, an industrial or consumer robot, and/or the like.

According to various embodiments of the present disclosure, an electronic device may be furniture, part of a building/structure, an electronic board, electronic signature receiving device, a projector, various measuring devices (e.g., water, electricity, gas or electro-magnetic wave measuring devices), and/or the like that include communication functionality.

According to various embodiments of the present disclosure, an electronic device may be any combination of the foregoing devices. In addition, it will be apparent to one having ordinary skill in the art that an electronic device according to various embodiments of the present disclosure is not limited to the foregoing devices.

According to various embodiments of the present disclosure, for example, a device may be an electronic device.

An embodiment of the present disclosure proposes an apparatus and method for providing a device-to-device (D2D) communication-based service for an isolated user equipment (IUE) in a mobile communication system. Here, the IUE is a terminal which is out of a service coverage of an enhanced node B (eNB) in a mobile communication system.

An embodiment of the present disclosure proposes an apparatus and method for providing a D2D communication-based service to an IUE which exists at outside of a service coverage of an eNB in a mobile communication system by establishing a link appropriate for a situation.

A method and apparatus proposed in various embodiments of the present disclosure may be applied to various communication systems such as a digital video broadcast system such as a mobile broadcast service such as a digital multimedia broadcasting (DMB) service, a digital video broadcasting-handheld (DVP-H), an advanced television systems committee-mobile/handheld (ATSC-M/H) service, and the like, and an internet protocol television (IPTV), a moving picture experts group (MPEG) media transport (MMT) system, an evolved packet system (EPS), a long term evolution (LTE) mobile communication system, an LTE-advanced (LTE-A) mobile communication system, a high speed downlink packet access (HSDPA) mobile communication system, a high speed uplink packet access (HSUPA) mobile communication system, a high rate packet data (HRPD) mobile communication system proposed in a $3^{rd}$ generation partnership project 2 (3GPP2), a wideband code division multiple access (WCDMA) mobile communication system proposed in the 3GPP2, a code division multiple access (CDMA) mobile communication system proposed in the 3GPP2, an institute of electrical and electronics engineers (IEEE) 802.16m communication system, and a mobile internet protocol (Mobile IP) system, and/or the like.

For convenience, in an embodiment of the present disclosure, it will be assumed that the mobile communication system is an LTE mobile communication system.

An embodiment of the present disclosure includes a procedure for establishing a D2D communication link and a relay cellular communication link for initial network registration of an IUE and a procedure for maintaining and managing, and changing a communication mode for maintaining and managing, and changing a communication link of an IUE.

Firstly, a procedure for establishing a D2D communication link and a relay cellular communication link for initial network registration of an IUE according to an embodiment of the present disclosure will be described below.

Prior to a description of a procedure for establishing a D2D communication link and a relay cellular communication link for initial network registration of an IUE, the following will be assumed.

Firstly, it will be assumed that user equipments (UEs) in which D2D communication is possible may dispersively perform a discovery operation and a pairing operation each other.

Secondly, it will be assumed that a radio resource used for performing a discovery operation and a pairing operation of UEs is a D2D communication dedicated resource in an LTE mobile communication system and uses a predefined radio frequency band.

Thirdly, an embodiment of the present disclosure assumes an LTE mobile communication system which has an environment in which there are an IUE which has no accessible enhanced node B (eNB) around and a relay UE (RUE) which accesses a serving eNB (SeNB) around the IUE, and this will be described with reference to FIG. 2.

Figure 2:
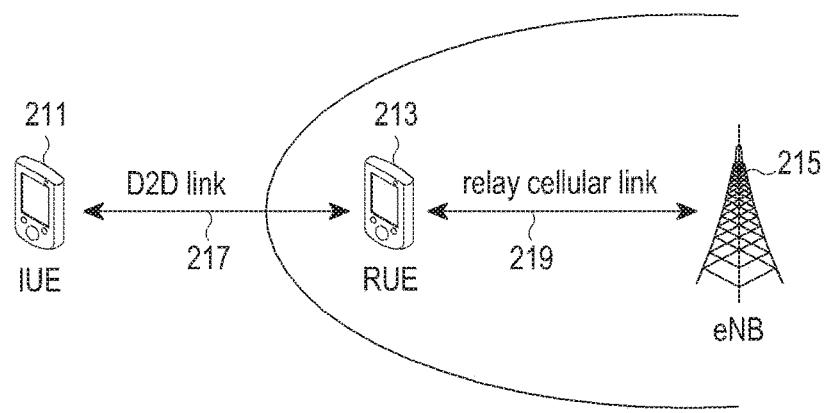
FIG. 2 schematically illustrates a basic network environment of an LTE mobile communication system according to an embodiment of the present disclosure.

FIG. 2 schematically illustrates a basic network environment of an LTE mobile communication system according to an embodiment of the present disclosure.

Referring to FIG. 2, the LTE mobile communication system includes an IUE 211, an RUE 213 and an eNB 215. Here, it will be assumed that a link between the IUE 211 and the RUE 213 is a D2D link, and a link between the RUE 213 and the eNB 215 is a relay cellular link.

A basic network environment of an LTE mobile communication system according to an embodiment of the present disclosure has been described with reference to FIG. 2, and a process for establishing a relay cellular link for an IUE in an LTE mobile communication system according to an embodiment of the present disclosure will be described with reference to FIGS. 3A and 3B.

Figure 3A:
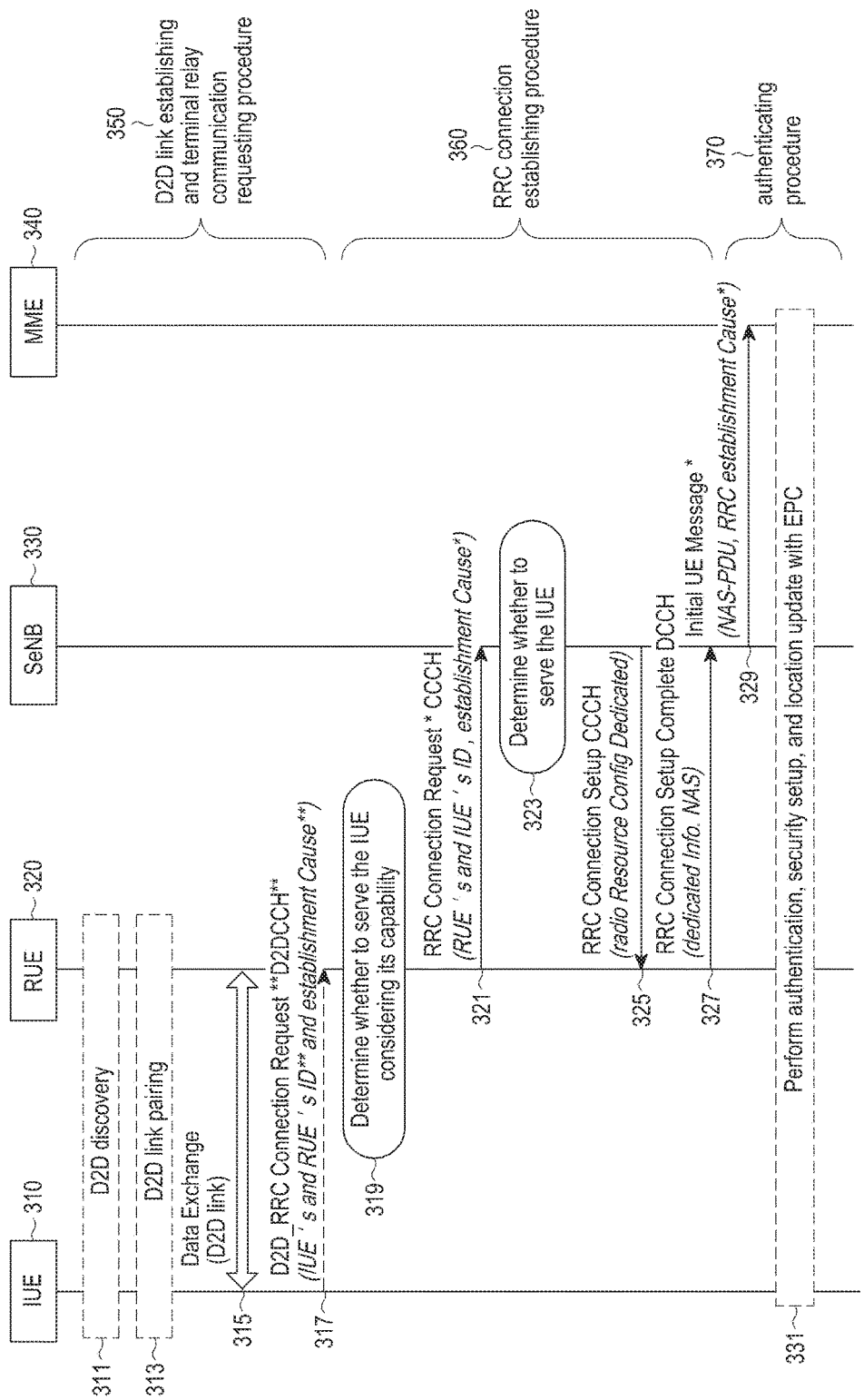
FIGS. 3A and 3B schematically illustrate a process for establishing a relay cellular link for an IUE in an LTE mobile communication system according to an embodiment of the present disclosure.
Figure 3B:
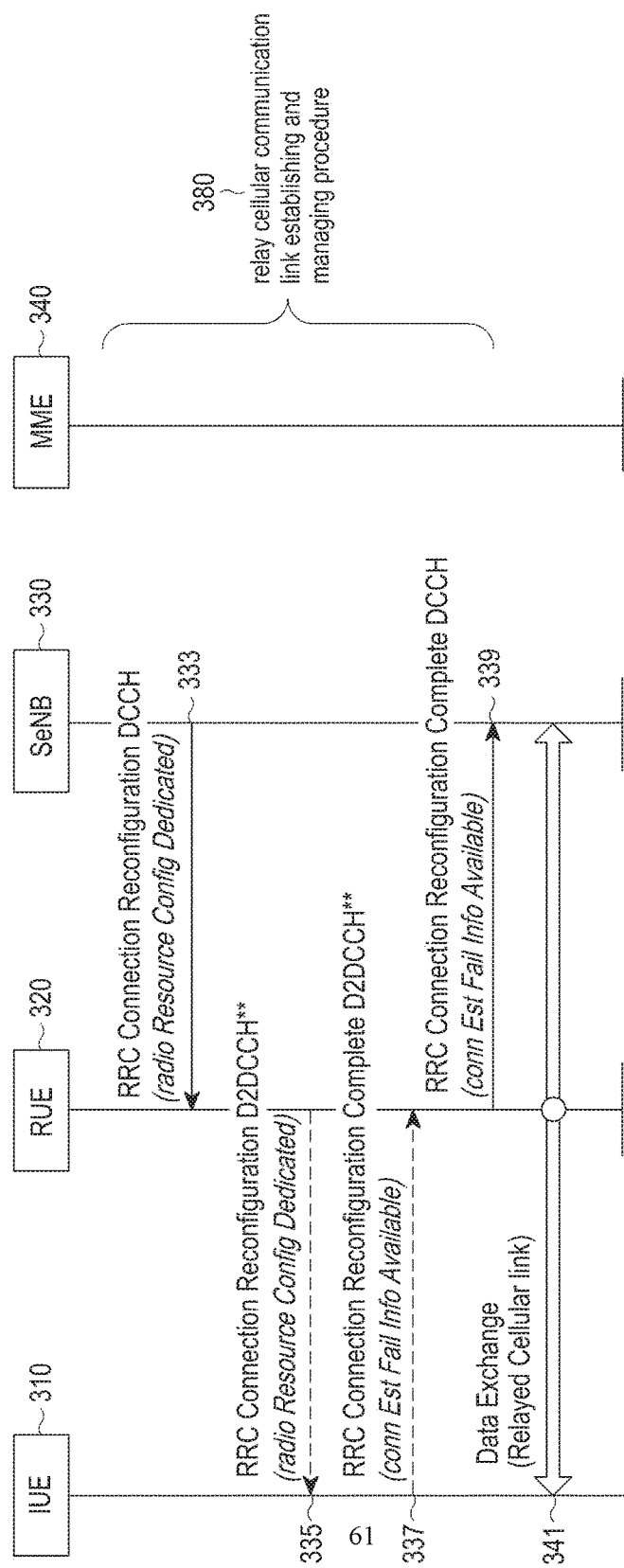

FIGS. 3A and 3B schematically illustrate a process for establishing a relay cellular link for an IUE in an LTE mobile communication system according to an embodiment of the present disclosure.

Referring to FIGS. 3A and 3B, the LTE mobile communication system includes an IUE 310, an RUE 320, an SeNB 330, and an MME 340. A process for establishing a relay cellular link for an IUE described in FIGS. 3A and 3B includes a D2D link establishing and terminal relay communication requesting procedure 350 in which the IUE 310 establishes a D2D link with the RUE 320 which is around the IUE 310, and requests relay cellular communication support to the RUE 320, a radio resource control (RRC) connection establishing procedure 360 in which the RUE 320 requests to establish an RRC connection between the RUE 320 and the SeNB 330 in order to support relay communication for the IUE 310, an authenticating procedure 370 in which the SeNB 330 performs operations such as authentication, security setup, location information update, and the like for the IUE 310 with the MME 340, and a relay cellular communication link establishing and managing procedure 380 in which the SeNB 330 reconfigures a parameter for an RRC connection between the IUE 310 and the RUE 320, or between the SeNB 330 and the RUE 320.

Each of the procedures will be described below.

Firstly, the D2D link establishing and terminal relay communication requesting procedure 350 in which the IUE 310 establishes the D2D link with the RUE 320 which is around the IUE 310, and requests the relay cellular communication support to the RUE 320 will be described below.

The IUE 310 performs a cell searching operation in order to search a neighbor eNB that the IUE 310 may preferentially access. If there is no neighbor eNB that the IUE 310 may access, the IUE 310 detects that the IUE 310 is on an isolated state, performs a D2D discovery operation to discover UEs which are around the IUE 310 at operation 311, and performs a D2D link pairing operation with a specific terminal, i.e., the RUE 320 at operation 313. An embodiment of the present disclosure proposes a relaying capable (RC) field with a preset number of bits-size, e.g., 1-bit size for a discovery message which is periodically transmitted by each UE for performing a discovery operation in order for the IUE 310 to select an RUE. That is, an arbitrary UE may set a field value of an RC field included in the discovery message to a preset value, e.g., '1' in order to indicate that the arbitrary UE normally accesses an eNB and the arbitrary UE may operate as an RUE at the same time. On the contrary to this, the arbitrary UE may set the field value of the RC field included in the discovery message to a preset value, e.g., '0' in order to indicate that the arbitrary UE may not operate as an RUE even though the arbitrary UE normally accesses an eNB. The IUE 310 receives discovery messages which are broadcasted by neighbor UEs, measures received signal strength of the received discovery messages, and detects a bit value of an RC bit included in each of the discovery messages. The IUE 310 selects an UE which is determined as the most appropriate for D2D communication or relay cellular communication as an RUE based on the bit value of the RC bit. The IUE 310 establishes a D2D link with the selected RUE, i.e., the RUE 320 based on a D2D communication protocol which is applied in a corresponding system, and performs D2D communication with the RUE 320 through the D2D link at operation 315.

After establishing the D2D link with the RUE 320, the IUE 310 transmits a D2D_RRC connection request message to the RUE 320 through a D2D control channel (D2DCCH) if there is a need for performing a relay cellular communication at operation 317. The D2DCCH is a D2D channel for transmitting and receiving a control message between terminals, and the D2CCH is a D2D channel which is newly proposed in an embodiment of the present disclosure. Of course, the D2DCCH may implemented by modifying a general D2D channel. The D2D_RRC connection request message is a message which is newly proposed for the IUE 310 to request relay cellular communication support to the RUE 320 in an embodiment of the present disclosure, and includes an identifier (ID) field between the IUE 310 and the RUE 320 and a D2D_establishment cause field. An ID between the IUE 310 and the RUE 320 is used for identifying messages which are received while the RUE 320 performs D2D communication with one or more IUEs. The D2D_establishment cause field is a field which is newly defined for indicating a reason for the request for the relay cellular communication support of the IUE 310 in an embodiment of the present disclosure. The IUE 310 sets a field value of the D2D_establishment cause field to a preset value, e.g., '1' upon requesting communication in an abnormal communication environment such as a disaster environment, and sets a field value of the D2D_establishment cause field to a preset value, e.g., '0' upon requesting communication in a normal communication environment. Upon receiving D2D_RRC connection request messages from one or more IUEs, the RUE 320 detects a bit value of a D2D_establishment cause field in each of the received D2D_RRC connection request messages, and preferentially supports relay cellular communication for an IUD which transmits a D2D_RRC connection request message of which a corresponding bit value is set to 1.

Next, the RRC connection establishing procedure 360 in which the RUE 320 requests to establish the RRC connection between the RUE 320 and the SeNB 330 in order to support the relay communication for the IUE 310 will be described below.

Upon receiving the D2D_RRC connection request message from the IUE 310, the RUE 320 determines whether relay communication support for the IUE 310 is possible based on the D2D_RRC connection request message at operation 319. If the relay communication support for the IUE 310 is possible, according to a current communication state of the RUE 320, the RUE 320 transmits, to the SeNB 330, and receives, from the SeNB 330, an RRC connection request message, an RRC connection setup message, and an RRC connection setup complete message, or an RRC connection re-establishment request message, an RRC connection re-establishment, and an RRC connection re-establishment complete message. A communication state of the RUE 320 may be one of an RRC-idle state and an RRC-connected state.

In a general LTE mobile communication system, RRC connection request related messages are transmitted, to an eNB, and received, from the eNB, in a case that a UE does not perform cellular communication, i.e., in an RRC-idle state case, and UEs request a radio resource for control message transmission and reception with an eNB through a procedure for transmitting and receiving RRC connection request related messages, and a corresponding resource is allocated to the UEs. In a general LTE mobile communication system, RRC connection re-establishment related messages are transmitted, to an eNB, and received, from the eNB, in a case that a UE performs cellular communication, i.e., in an RRC-connected state case, and a UE reports to an eNB that there is a need for reestablishing an RRC connection due to degradation of channel quality of an existing RRC link by transmitting, to an eNB, and receiving, from the eNB, RRC connection re-establishment related messages, and receives a parameter for a new RRC connection. An RRC connection request message and an RRC connection re-establishment request message which are firstly transmitted by a UE among the messages described above include an information element (IE) such as an ID which may identify a UE which transmits a corresponding message, an establishment cause indicating a reason for RRC connection request, and the like. The establishment cause IE is used for a UE to indicate a reason for an RRC connection of the UE to an eNB in a general LTE mobile communication system, and includes an RRC connection reason field indicating one of six reasons, and two spare fields. Here, the RRC connection reason field indicates one of emergency, high priority access, mobile terminating access, mobile originating signaling, mobile originating data, and delay tolerant access.

So, an embodiment of the present disclosure includes a D2D_relaying field into the establishment cause IE thereby the RUE 320 uses the D2D_relaying field in order to request relay cellular communication for the IUE 310 to the SeNB 330.

In an embodiment of the present disclosure, it will be assumed that the RUE 320 is on an RRC-Idle state. So, the RUE 320 transmits an RRC connection request message to the SeNB 330 through a common control channel (CCCH) at operation 321. The RRC connection request message includes an ID between an RUE and an IUE, and an establishment cause IE. After receiving the RRC connection request message from the RUE 320, the SeNB 330 determines whether to support relay communication for the IUE 310 based on the RRC connection request message at operation 323, and transmits an RRC connection setup message as a response message to the RRC connection request message to the RUE 320 corresponding to the determined result to inform whether to support the relay communication for the IUE 310 and allocate a dedicated control channel (DCCH) as a dedicated resource for an RRC connection between the SeNB 330 and the RUE 320 at operation 325. After receiving information on the DCCH, the RUE 320 informs that radio resource allocation has been normally completed by transmitting an RRC connection setup complete message as a response message to the RRC connection setup message to the SeNB 330 through the DCCH at operation 327.

Thirdly, the authenticating procedure 370 in which the SeNB 330 performs the operations such as the authentication, the security setup, the location information update, and the like for the IUE 310 with the MIME 340 will be described below.

The SeNB 330 requests authentication for the IUE 310 by transmitting an initial UE message to the MME 430 at operation 329. An RRC establishment cause IE included in the Initial UE message is a field for indicating a reason why the SeNB 330 transmits the Initial UE message to the MIME 340 in a general LTE mobile communication system, and includes a field identical to an establishment cause IE included in the RRC connection request message. In an embodiment of the present disclosure, the RRC establishment cause IE is extended like the establishment cause IE, and used for the SeNB 330 to request relay cellular communication for the IUE 310 to the MIME 340. After receiving the initial UE message, the MME 340 detects a D2D_relying field included in the initial UE message to perform an authentication operation for the IUE 310 at operation 331. If the authentication for the IUE 310 has been successfully completed, the MIME 340 performs a cipher key generating and location information updating operation for the IUE 310 with the SeNB 330 based on relay communication of the RUE 320 at operation 331.

Lastly, the relay cellular communication link establishing and managing procedure 380 in which the SeNB 330 reconfigures the parameter for the RRC connection between the IUE 310 and the RUE 320, or between the SeNB 330 and the RUE 320 will be described below.

The SeNB 330 includes a parameter for an RRC connection to be used for data transmission and reception between the SeNB 330 and the RUE 320 or between the RUE 320 and the IUE 310 into an RRC connection reconfiguration message to transmit the RRC connection reconfiguration message to the RUE 320 at operation 333. The RUE 320 receives the RRC connection reconfiguration message to reconfigure an RRC connection between the RUE 320 and the SeNB 330, and transmits the RRC connection reconfiguration message to the IUE 310 through a D2DCCH at operation 335.

The IUE 310 performs a reconfiguration operation for a D2D link and an RRC connection based on the RRC connection reconfiguration message, and transmits an RRC connection reconfiguration complete message as a response message to the RRC connection reconfiguration message to the RUE 320 through a D2DCH at operation 337. After receiving the RRC connection reconfiguration complete message from the IUE 310, the RUE 320 performs a reconfiguration operation for a D2D link and an RRC connection based on the RRC connection reconfiguration message, and transmits an RRC connection reconfiguration complete message to the SeNB 330 through a DCCH at operation 339.

So, data transmission and reception through a relay cellular link become possible among the IUE 310, the RUE 320, and the SeNB 330 at operation 341.

Although FIGS. 3A and 3B illustrate a process for establishing a relay cellular link for an IUE in an LTE mobile communication system according to an embodiment of the present disclosure, various changes could be made to FIGS. 3A and 3B. For example, although shown as a series of operations, various operations in FIGS. 3A and 3B could overlap, occur in parallel, occur in a different order, or occur multiple times.

A process for establishing a relay cellular link for an IUE in an LTE mobile communication system according to an embodiment of the present disclosure has been described with reference to FIGS. 3A and 3B. In a network environment which does not supports distribute D2D link establishment for UEs, or a network environment in which there is a need for authenticating all terminals on performing communication, i.e., a network environment which there is a need for D2D communication which is based on eNB control, there may be difficult to establish a relay cellular link for an IUE as described in FIGS. 3A and 3B.

So, a process for establishing a D2D communication link and a relay cellular communication link in a network environment that a D2D communication which is based on eNB control is requested will be described below. Firstly, a network environment that a D2D communication which is based on eNB control is requested in an LTE mobile communication system according to an embodiment of the present disclosure will be described with reference to FIG. 4.

Figure 4:
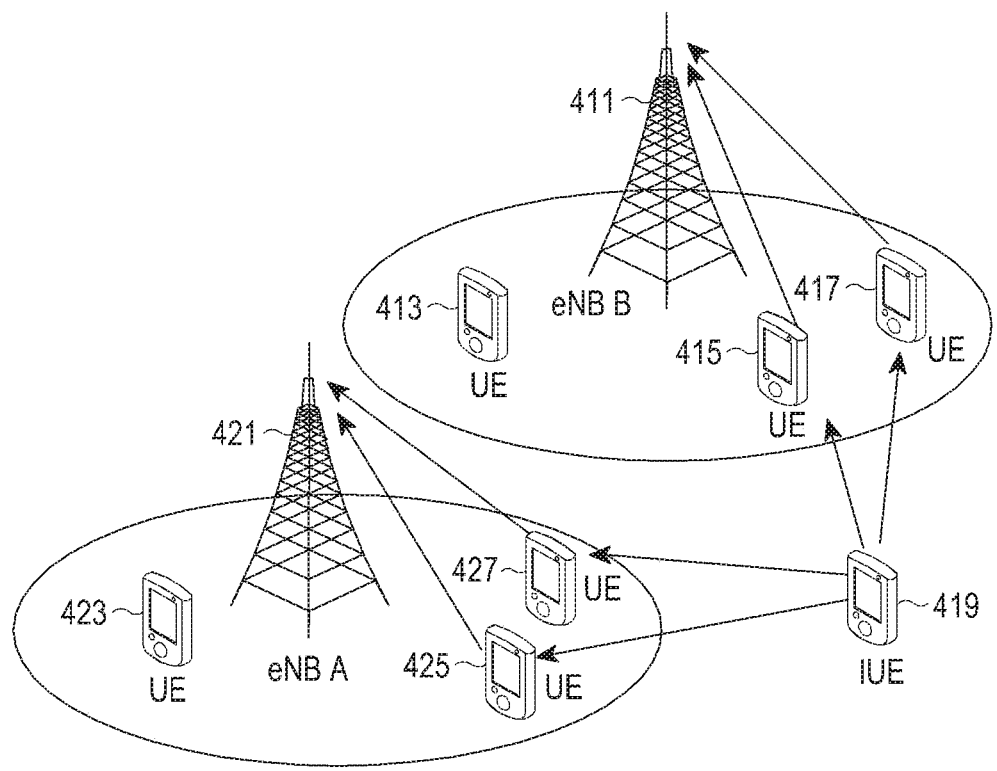
FIG. 4 schematically illustrates a network environment that a D2D communication which is based on eNB control is requested in an LTE mobile communication system according to an embodiment of the present disclosure.

FIG. 4 schematically illustrates a network environment that a D2D communication which is based on eNB control is requested in an LTE mobile communication system according to an embodiment of the present disclosure.

Referring to FIG. 4, the LTE mobile communication system includes an eNB B 411, UEs 413, 415, and 417, an IUE 419, an eNB A 421, and UEs 423, 425, and 427.

A network environment that a D2D communication which is based on eNB control is requested in an LTE mobile communication system according to an embodiment of the present disclosure has been described with reference to FIG. 4, and a process for establishing a D2D communication link and a relay cellular communication link in a network environment that a D2D communication which is based on eNB control is requested in an LTE mobile communication system according to an embodiment of the present disclosure will be described with reference to FIGS. 5A to 5C.

Figure 5A:
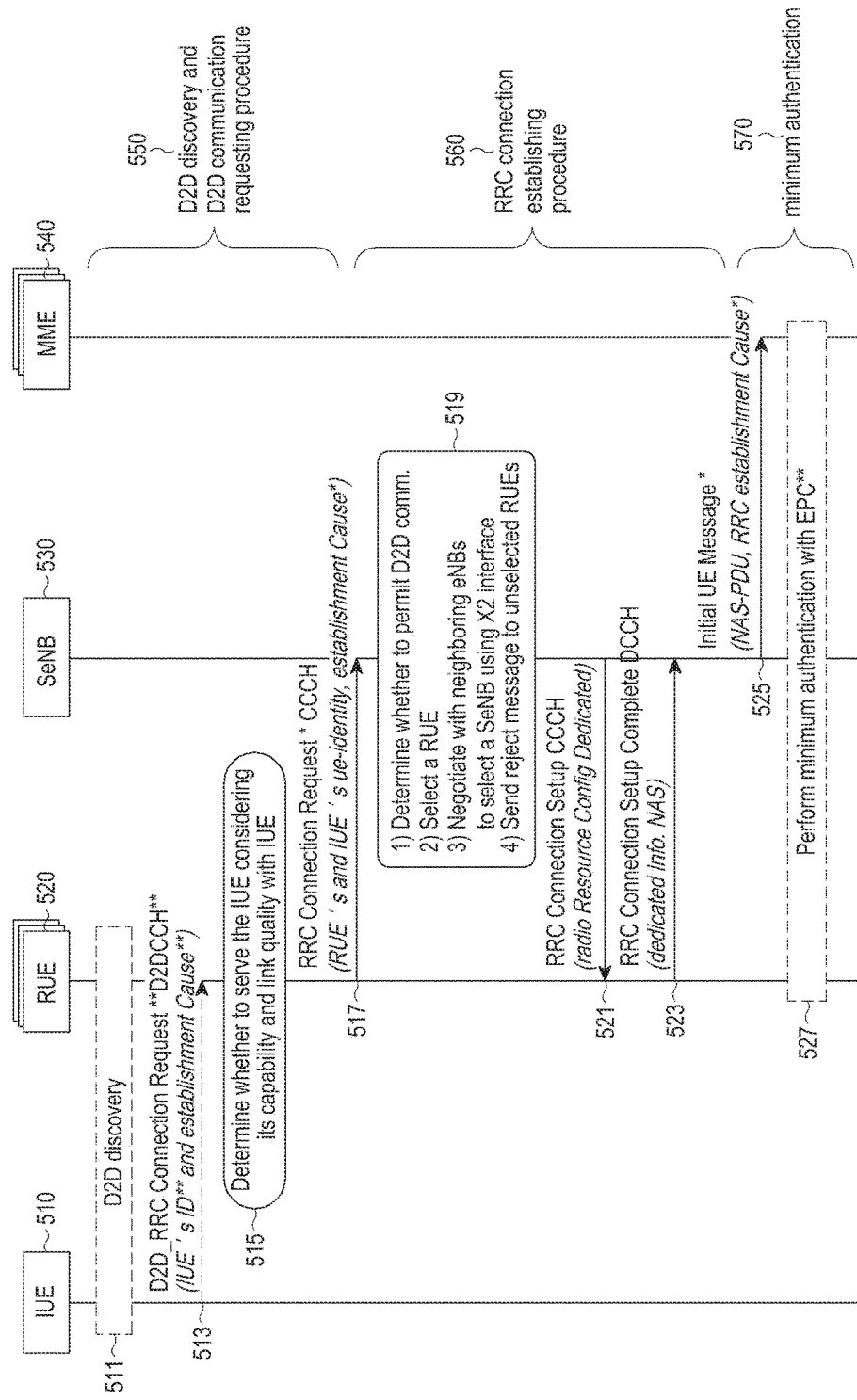
FIGS. 5A to 5C schematically illustrate a process for establishing a D2D communication link and a relay cellular communication link in a network environment that a D2D communication which is based on eNB control is requested in an LTE mobile communication system according to an embodiment of the present disclosure.
Figure 5B:
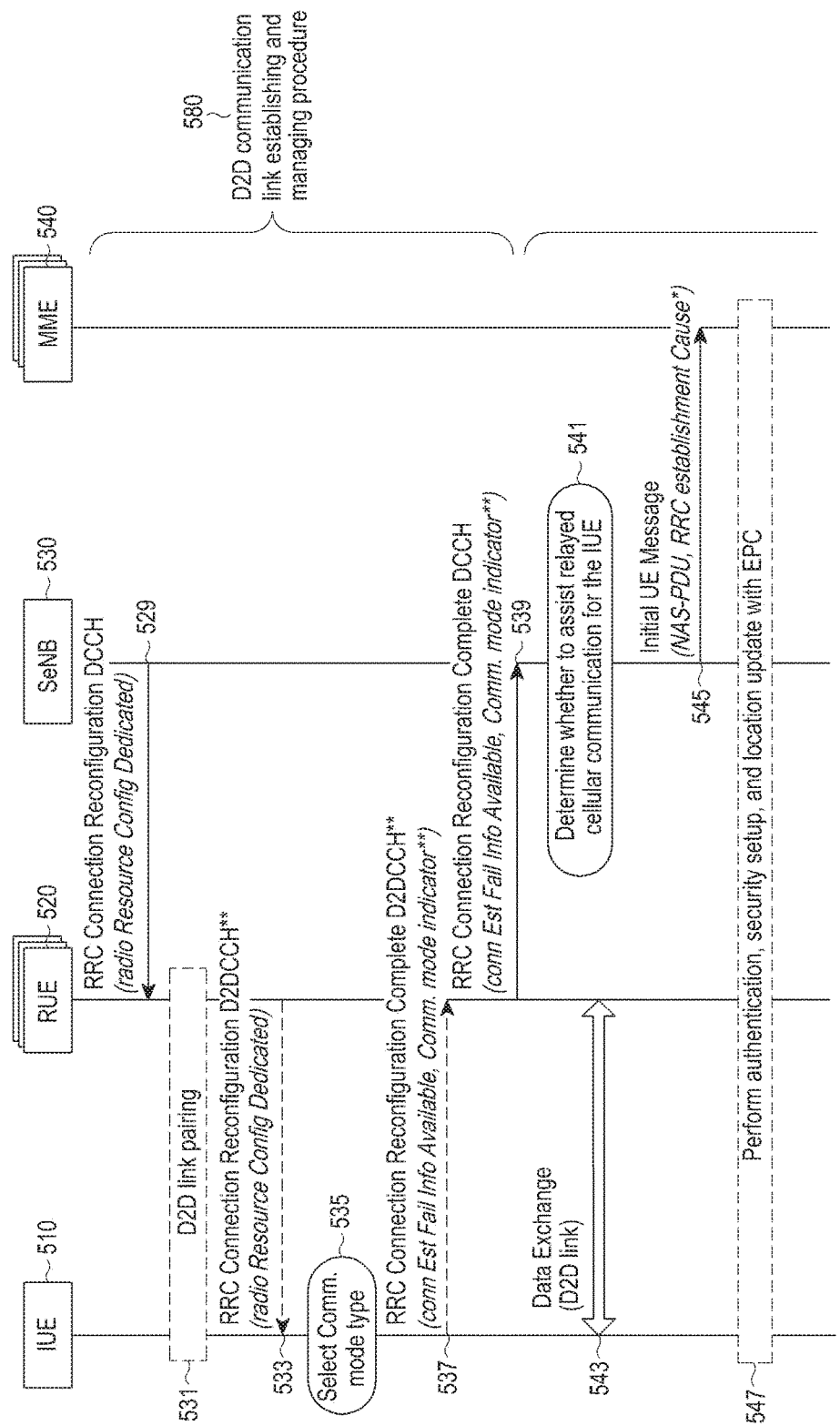
Figure 5C:
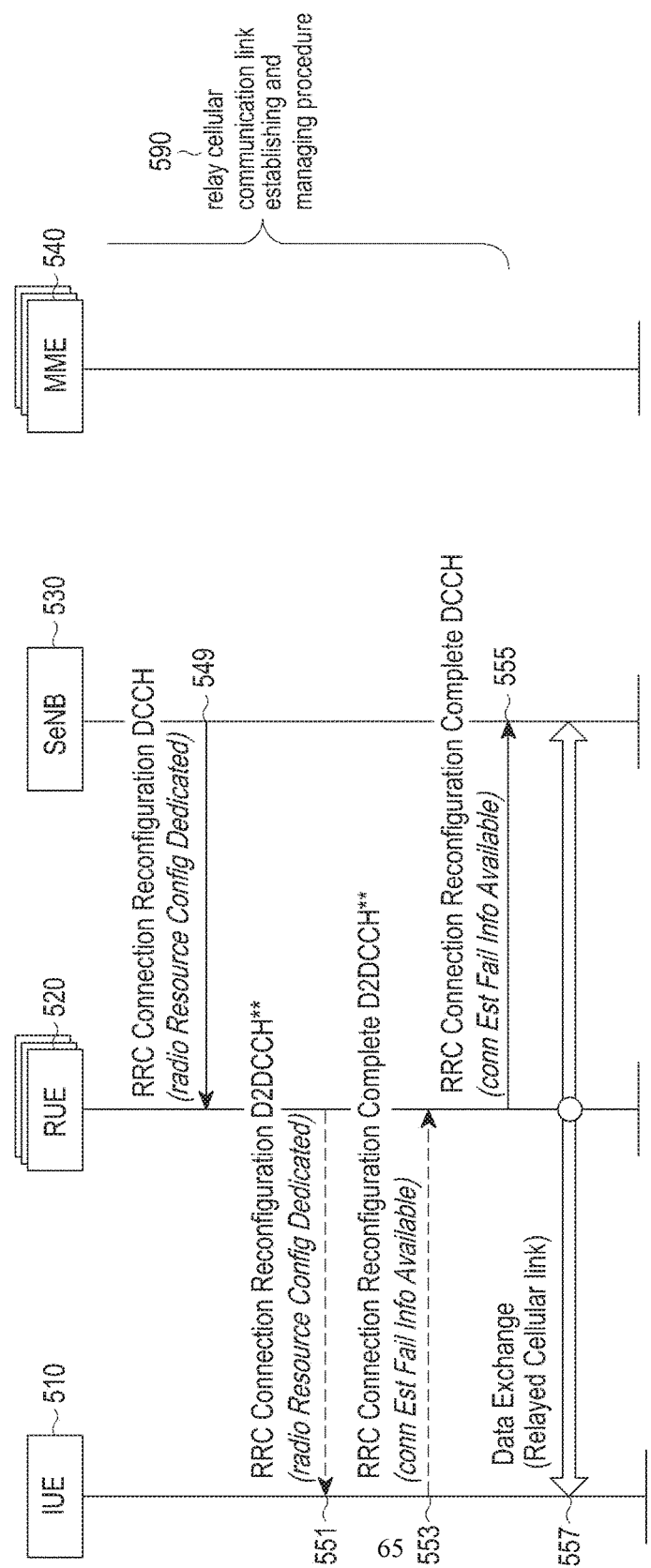

FIGS. 5A to 5C schematically illustrate a process for establishing a D2D communication link and a relay cellular communication link in a network environment that a D2D communication which is based on eNB control is requested in an LTE mobile communication system according to an embodiment of the present disclosure.

Referring to FIGS. 5A to 5C, the LTE mobile communication system includes an IUE 510, an RUE 520, an SeNB 530, and an MME 540. Prior to a description of a process for establishing a D2D communication link and a relay cellular communication link described in FIGS. 5A to 5C, the following will be assumed.

Firstly, it will be assumed that UEs need to perform D2D link pairing with a specific UE after D2D communication support and authentication from a network.

Secondly, it will be assumed that there is one or more candidate RUEs around an IUE, and each candidate RUE accesses a specific eNB (SeNB).

A process for establishing a D2D communication link and a relay cellular communication link described in FIGS. 5A to 5C includes a D2D discovery and D2D communication requesting procedure 550, an RRC connection establishing procedure 560, an authenticating procedure 570, a D2D communication link establishing and managing procedure 580, and a relay cellular communication link establishing and managing procedure 590, and each of the D2D discovery and D2D communication requesting procedure 550, the RRC connection establishing procedure 560, the authenticating procedure 570, the D2D communication link establishing and managing procedure 580, and the relay cellular communication link establishing and managing procedure 590 will be described below.

Firstly, the D2D discovery and D2D communication requesting procedure 550 will be described below.

The IUE 510 detects that the IUE 510 is on an isolated state through a cell discovery operation, and performs a D2D discovery operation for neighbor terminals at operation 511. Upon detecting that there is one or more UEs around the IUE 510 according to the discovery operation result, the IUE 510 broadcasts a D2D_RRC connection request message to the one or more UEs through a D2DCCH at operation 513. The D2D_RRC connection request message includes an ID of the IUE 510, and an establishment cause IE indicating a reason why the D2D_RRC connection request message is transmitted. After receiving the D2D_RRC connection request message, UEs determine whether to support communication for the IUE 510 based on received signal strength of the D2D_RRC connection request message, a state of the UEs which receive the D2D_RRC connection request message, and the like at operation 515.

Secondly, the RRC connection establishing procedure 560 will be described below.

Candidate RUEs which determine that communication support for the IUE 510 is possible according to the determined result for whether to support the communication for the IUE 510 transmits an RRC connection request message to eNBs (SeNBs) that the candidate RUEs access to request communication support for the IUE 510 at operation 517. After receiving the RRC connection request message, the eNBs (SeNBs) determine whether to support relay communication for the IUE 510, and select an RUE which will support communication of the IUE 510 based on received signal strength (link quality) received from corresponding RUEs. The eNBs (SeNBs) select an SeNB which will support the communication of the IUE 510 based on link quality between an RUE which is selected in each eNB (SeNB) and the IUE 510, or traffic load of each cell with neighbor eNBs (SeNBs) of the eNBs (SeNBs) through an X2 interface at operation 519. After performing the described process, the SeNB 530 allocates a resource for an RRC connection between the SeNB 530 and the RUE 520, and transmits an RRC connection setup message including information on this to the RUE 520 through a CCCH at operation 521. After receiving the RRC connection setup message from the SeNB 530, the RUE 520 transmits an RRC connection setup complete message as a response message to the RRC connection setup message to the SeNB 530 through a DCCH at operation 523.

Thirdly, the authenticating procedure 570 will be described below.

In a general LTE mobile communication system, authentication for a UE is performed by acquiring an authentication vector for a specific UE through a home subscriber server (HSS) and performing a mutual authentication operation with the UE using the acquired authentication vector in an MME.

An embodiment of the present disclosure defines a minimum authenticating procedure as an authenticating procedure for establishing a D2D link of the IUE 510. In the minimum authenticating procedure, the MME 540 receives an ID of the IUE 510 from the RUE 520 in order to perform authentication for the IUE 510, and transmits the ID of the IUE 510 to an HSS (not shown in FIGS. 5A to 5C). The HSS determines whether the IUD 510 is a UE which is registered at a corresponding cellular system based on the received ID of the IUE 510, and transmits the determined result for this to the MME 540. If the minimum authenticating procedure has been normally completed, the MME 540 informs this to the SeNB 530, and the SeNB 530 transmits resource information for D2D communication of the IUE 510 and the RUE 520 at operation 527.

Fourthly, the D2D communication link establishing and managing procedure 580 will be described below.

The SeNB 530 transmits an RRC connection reconfiguration message to the RUE 520 at operation 529 to allocate a resource for an RRC connection between the SeNB 530 and the RUE 520 or D2D communication between the RUE 520 and the IUE 510. After receiving the RRC connection reconfiguration message from the SeNB 530, the RUE 520 performs a D2D link pairing operation with the IUE 510 at operation 531. After performing the D2D link pairing operation with the IUE 510, the RUE 520 transmits resource information for communication between the RUE 520 and the IUE 510 using an RRC connection reconfiguration message through a D2DCCH at operation 533.

After receiving the RRC connection reconfiguration message from the RUE 520, the IUE 510 selects a communication mode type at operation 535, and transmits an RRC connection reconfiguration complete message including information indicating the selected communication mode type to the RUE 520 at operation 537. The communication mode type indicates a type of a communication mode that a corresponding UE intends to perform. In FIGS. 5A to 5C, it will be assumed that the IUE 510 selects the type of the communication mode as relay cellular type communication. After receiving the RRC connection reconfiguration complete message from the IUE 510, the RUE 520 transmits the RRC connection reconfiguration complete message to the SeNB 530 at operation 539. The RRC connection reconfiguration complete message transmitted at operations 537 and 539 includes a non-critical extensions future field, and the non-critical extensions future field is defined as a D2D_relayed cellular link request field which is a field indicating whether to select relay cellular communication in an IUE in an embodiment of the present disclosure. That is, if there is a need for relay cellular communication, the IUE 510 sets a field value of the D2D_relayed cellular link request field to a preset value, e.g., '1'. On the contrary to this, if there is no need for relay cellular communication, the IUE 510 sets a field value of the D2D_relayed cellular link request field to a preset value, e.g., '0'. After the RRC connection reconfiguration complete message through the RUE 520, the SeNB 530 determines whether to support relay cellular communication for the IUE 510 based on a field value of a D2D_relayed cellular link request field included in the RRC connection reconfiguration complete message.

Fifthly, the relay cellular communication link establishing and managing procedure 590, i.e., the relay cellular communication link establishing and managing procedure 590 which corresponds to operations 541 to 557 is performed like relay cellular communication link establishing and managing procedure described in FIGS. 3A and 3B, and a description thereof will be omitted herein.

Although FIGS. 5A to 5C illustrate a process for establishing a D2D communication link and a relay cellular communication link in a network environment that a D2D communication which is based on eNB control is requested in an LTE mobile communication system according to an embodiment of the present disclosure, various changes could be made to FIGS. 5a to 5c. For example, although shown as a series of operations, various operations in FIGS. 5a to 5c could overlap, occur in parallel, occur in a different order, or occur multiple times.

A procedure for establishing a D2D communication link and a relay cellular communication link for initial network registration of an IUE according to an embodiment of the present disclosure has been described with reference to FIGS. 2 to 5c, and a procedure for maintaining, managing, and changing a communication mode for maintaining, managing, and changing a communication link of an IUE according to an embodiment of the present disclosure will be described below.

An embodiment of the present disclosure defines seven scenarios which may occur according to movement of an IUE or an RUE, and proposes a procedure for maintaining, managing, and changing a communication mode which may be applied to each of the seven scenarios. The seven scenarios defined in an embodiment of the present disclosure are classified into a case that a communication link is changed at the same cell and a case that a communication link is changed to another cell. Here, communication link change at the same cell denotes communication link change to an eNB which is at the same cell or another RUE which belongs to the same cell according to change of a point of attachment (PoA) of an IUE because of movement of the IUE or an RUE. Alternatively, link change to another cell denotes link change according that there is a need for changing an eNB which supports communication of an IUE because of movement of UEs.

A procedure for maintaining, managing, and changing a communication mode for maintaining, managing, and changing a communication link of an IUE according to an embodiment of the present disclosure in a case that link change at the same cell will be assumed will be described below.

An environment that an IUE changes a communication link from a relay communication link (a relay cellular communication link) with an RUE to a direct communication link with an SeNB in an LTE mobile communication link according to an embodiment of the present disclosure will be described with reference to FIG. 6.

Figure 6:
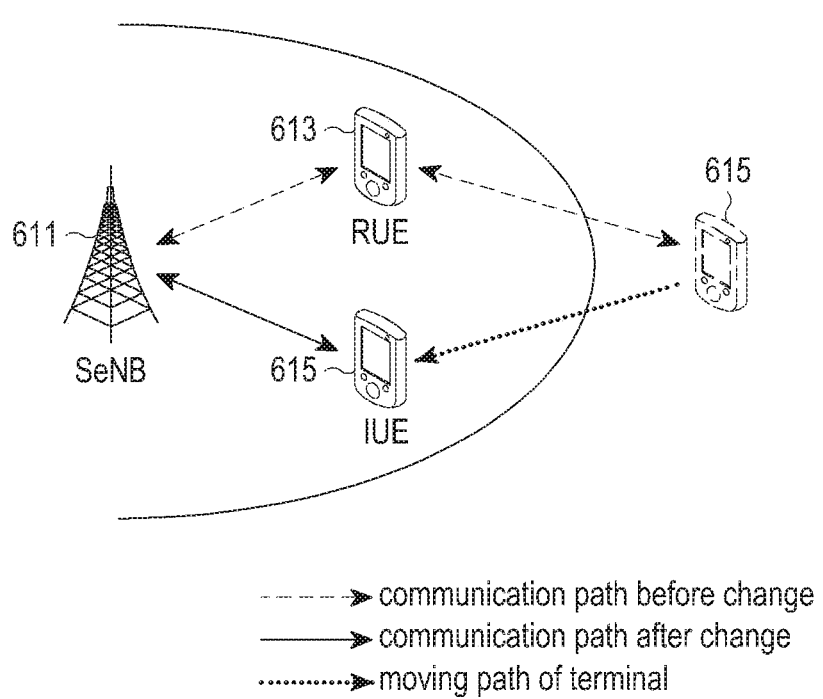
FIG. 6 schematically illustrates an environment that an IUE changes a communication link from a relay communication link (a relay cellular communication link) with an RUE to a direct communication link with an SeNB in an LTE mobile communication link according to an embodiment of the present disclosure.

FIG. 6 schematically illustrates an environment that an IUE changes a communication link from a relay communication link (a relay cellular communication link) with an RUE to a direct communication link with an SeNB in an LTE mobile communication link according to an embodiment of the present disclosure.

Referring to FIG. 6, the LTE mobile communication system includes an SeNB 611, an RUE 613, and an IUE 615. Upon moving into a service coverage of a specific cell while performing relay cellular communication through the RUE 613 at outside of the service coverage of the specific cell, the IUE 615 performs direct communication with the SeNB 611. The IUE 615 generates and updates a list for a candidate RUE for communication link change by periodically measuring and comparing communication link quality of the IUE 615, and received signal strength from the SeNB 611 or received signal strength from neighbor UEs which may support relay cellular communication.

An environment that an IUE changes a communication link from a relay communication link (a relay cellular communication link) with an RUE to a direct communication link with an SeNB in an LTE mobile communication link according to an embodiment of the present disclosure has been described with reference to FIG. 6, and a process in which an IUE changes a communication link from a relay communication link (a relay cellular communication link) with an RUE to a direct communication link with an SeNB in an LTE mobile communication link according to an embodiment of the present disclosure will be described with reference to FIG. 7.

Figure 7:
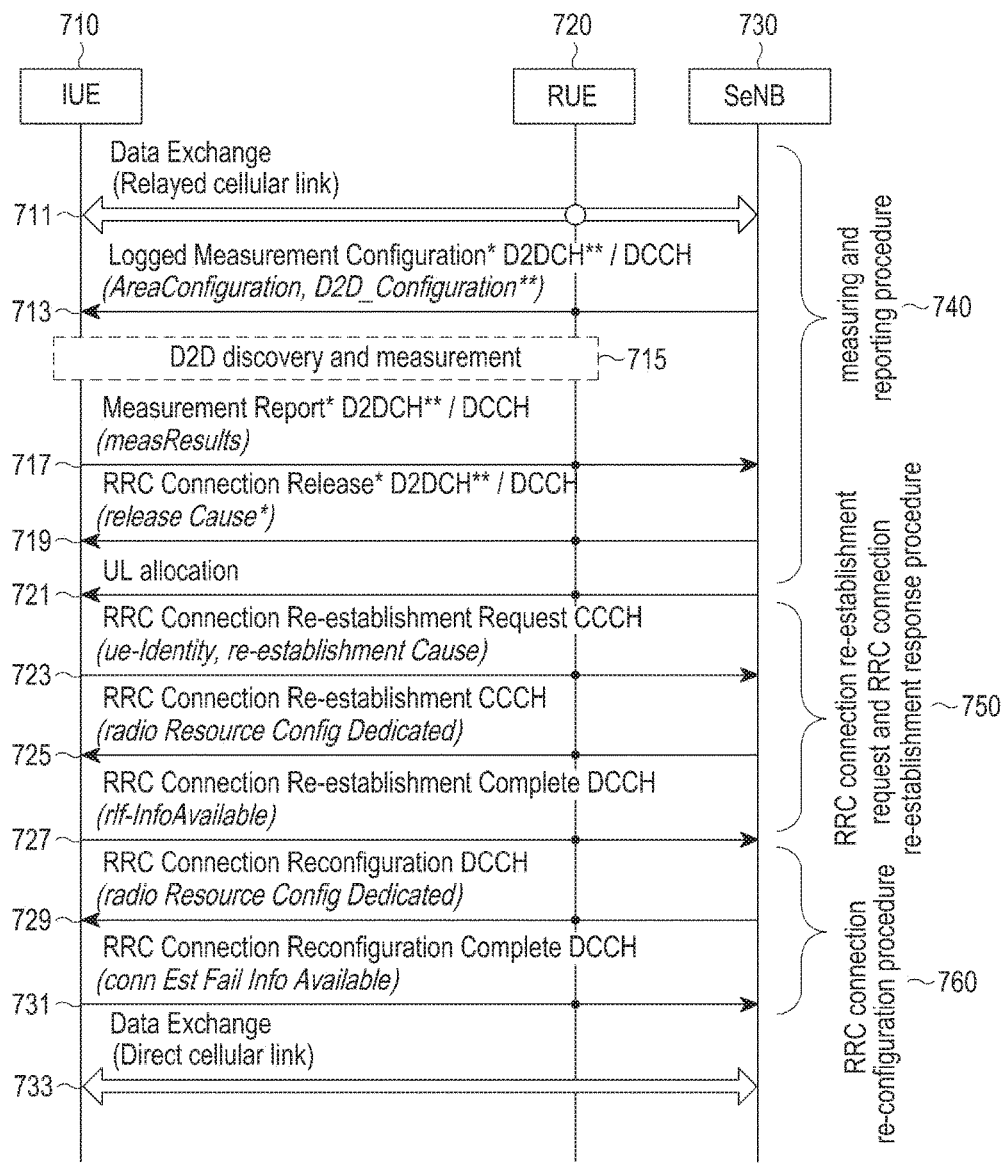
FIG. 7 schematically illustrates a process in which an IUE changes a communication link from a relay communication link (a relay cellular communication link) with an RUE to a direct communication link with an SeNB in an LTE mobile communication link according to an embodiment of the present disclosure.

FIG. 7 schematically illustrates a process in which an IUE changes a communication link from a relay communication link (a relay cellular communication link) with an RUE to a direct communication link with an SeNB in an LTE mobile communication link according to an embodiment of the present disclosure.

Referring to FIG. 7, the LTE mobile communication system includes an IUE 710, an RUE 720, and an SeNB 730.

A process in which the IUE 710 changes a communication link from a relay communication link (a relay cellular communication link) with the RUE 720 to a direct communication link with an SeNB illustrated in FIG. 7 includes a measuring and reporting procedure 740 in which the IUE 710 performs a neighbor cell searching operation and a measuring operation form the SeNB 730 through relay of the RUE 720, and reports a measured result according to the measuring operation, an RRC connection re-establishment request and RRC connection re-establishment response procedure 750 in which the IUE 710 determines that communication with the SeNB 730 is possible, and a radio resource for direct communication is allocated from the SeNB 730 to the IUE 710, and an RRC connection re-configuration procedure 760 in which the IUE 710 receives information for reconfiguring an existing RRC connection from the SeNB 730 according to change of a network environment. Each of the measuring and reporting procedure 740 in which the IUE 710 performs the neighbor cell searching operation and the measuring operation from the SeNB 730 through the relay of the RUE 720, and reports the measured result according to the measuring operation, the RRC connection re-establishment request and RRC connection re-establishment response procedure 750 in which the IUE 710 determines that the communication with the SeNB 730 is possible, and the radio resource for the direct communication is allocated from the SeNB 730 to the IUE 710, and the RRC connection re-configuration procedure 760 in which the IUE 710 receives the information for reconfiguring the existing RRC connection from the SeNB 730 according to the change of the network environment will be described below.

Firstly, the measuring and reporting procedure 740 in which the IUE 710 performs the neighbor cell searching operation and the measuring operation from the SeNB 730 through the relay of the RUE 720, and reports the measured result according to the measuring operation will be described below.

While data transmission and reception is performed among the IUE 710, the RUE 720, and the SeNB 730 through a relay cellular link at operation 711, the SeNB 730 transmits a logged measurement configuration message to the IUE 710 through the RUE 720 at operation 713. After receiving the logged measurement configuration message from the SeNB 730 through the RUE 20, the IUE 710 performs a neighbor cell searching operation, a quality measuring operation for a link in which communication is ongoing, a D2D discovery operation, and the like based on measurement configuration information included in the logged measurement configuration message at operation 715, and reports a measured report to the SeNB 730 using a measurement report message at operation 717. In an embodiment of the present disclosure, the IUE 710 performs the D2D discovery operation to detect presence of neighbor terminals of the IUE 710, and generates and updates a list for candidate RUEs for which link change is considered to be possible in the IUE 710 at operation 715.

If it is determined that there is a need for the link change, the IUE 710 performs link change to a corresponding UE by transmitting a communication request message to candidate RUEs included in a list of the IUE 710. After receiving the measurement report message from the IUE 710, the SeNB 730 determines whether to perform link change of the IUE 710 based on the measurement report, transmits an RRC connection release message to the IUE 710 upon determining that there is a need for the link change at operation 719, and allocates a uplink (UL) resource to the IUE 710 thereby the IUE 710 may transmit an RRC connection re-establishment request message at operation 721. The RRC Connection Release message is a message that an eNB transmits to an IUE in order to release an RRC connection, and includes a release cause IE indicating a reason for RRC connection release. The release cause IE indicates one of three reasons, i.e., load balancing, cs-fallback, and other. An embodiment of the present disclosure additionally defines a D2D_mode switch reason indicating a reason for link change of an IUE to use the D2D_mode switch reason in order for an eNB to control a communication mode of an IUE. In the measuring and reporting procedure 740, messages transmitted and received between the IUE 710 and the SeNB 730 are transmitted and received through a D2DCCH which is newly defined between the IUE 710 and the RUE 720, and a DCCH between the RUE 720 and the SeNB 730.

Secondly, the RRC connection re-establishment request and RRC connection re-establishment response procedure 750 in which the IUE 710 determines that the communication with the SeNB 730 is possible, and the radio resource for the direct communication is allocated from the SeNB 730 to the IUE 710 will be described below.

After a resource for uplink transmission is allocated from the SeNB 730 to the IUE 710, in the RRC connection re-establishment request and RRC connection re-establishment response procedure 750, the IUE 710 transmits, to the SeNB 730, and receives, from the SeNB 730, an RRC connection re-establishment request message, an RRC connection re-establishment message, and an RRC connection re-establishment complete message, so a resource for a new RRC connection is allocated to the IUE 710 at operations 723, 725, and 727.

Thirdly, the RRC connection re-configuration procedure 760 in which the IUE 710 receives the information for reconfiguring the existing RRC connection from the SeNB 730 according to the change of the network environment will be described below.

In the RRC connection re-configuration procedure 760, the IUE 710 transmits, to the SeNB 730, and receives, from the SeNB 730, an RRC connection reconfiguration message and an RRC connection reconfiguration complete message to reconfigure an RRC connection between the IUE 710 and the SeNB 730 at operations 727 and 729. According that the RRC connection is reconfigured, the IUE 710 performs direct cellular communication with the SeNB 730 through the allocated resource at operation 733.

Although FIG. 7 illustrates a process in which an IUE changes a communication link from a relay communication link (a relay cellular communication link) with an RUE to a direct communication link with an SeNB in an LTE mobile communication link according to an embodiment of the present disclosure, various changes could be made to FIG. 7. For example, although shown as a series of operations, various operations in FIG. 7 could overlap, occur in parallel, occur in a different order, or occur multiple times.

A process in which an IUE changes a communication link from a relay communication link (a relay cellular communication link) with an RUE to a direct communication link with an SeNB in an LTE mobile communication link according to an embodiment of the present disclosure has been described with reference to FIG. 7, and an environment that an IUE moves out of a service coverage of an SeNB while performing direct communication with the SeNB, and establishes a relay cellular communication link with a specific RUE in an LTE mobile communication system according to an embodiment of the present disclosure will be described with reference to FIG. 8.

Figure 8:
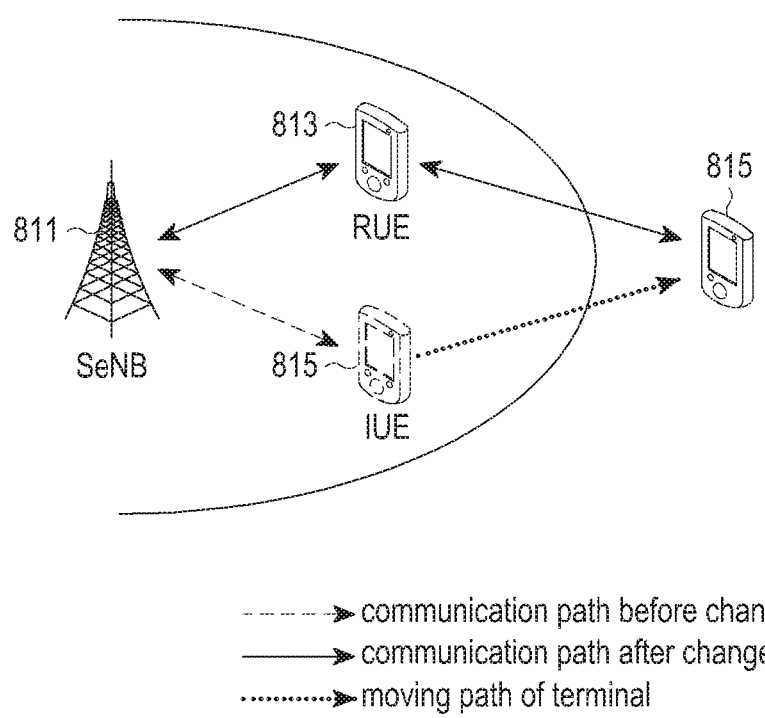
FIG. 8 schematically illustrates an environment that an IUE moves out of a service coverage of an SeNB while performing direct communication with the SeNB, and establishes a relay cellular communication link with a specific RUE in an LTE mobile communication system according to an embodiment of the present disclosure.

FIG. 8 schematically illustrates an environment that an IUE moves out of a service coverage of an SeNB while performing direct communication with the SeNB, and establishes a relay cellular communication link with a specific RUE in an LTE mobile communication system according to an embodiment of the present disclosure.

Referring to FIG. 8, the LTE mobile communication system includes an SeNB 811, an RUE 813, and an IUE 815. The IUE 815 performs change to a relay cellular link with another terminal in a general communication link (direct communication or relay cellular communication), so the IUE 815 may use a D2D link and relay cellular link establishing procedure proposed in an embodiment of the present disclosure.

An environment that an IUE moves out of a service coverage of an SeNB while performing direct communication with the SeNB, and establishes a relay cellular communication link with a specific RUE in an LTE mobile communication system according to an embodiment of the present disclosure has been described with reference to FIG. 8, and a process in which an IUE moves out of a service coverage of an SeNB while performing direct communication with the SeNB, and establishes a relay cellular communication link with a specific RUE in an LTE mobile communication system according to an embodiment of the present disclosure will be described with reference to FIGS. 9A and 9B.

Figure 9A:
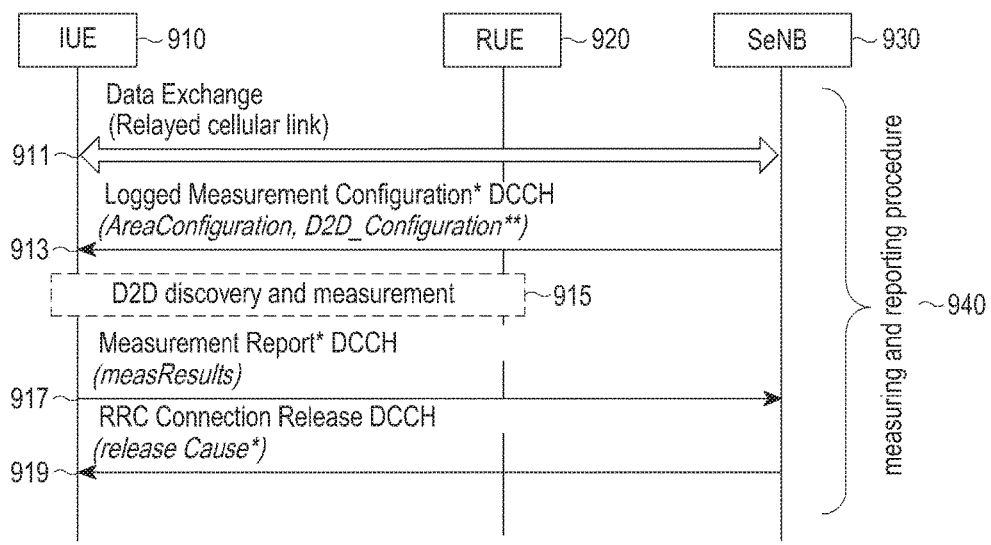
FIGS. 9A and 9B schematically illustrate a process in which an IUE moves out of a service coverage of an SeNB while performing direct communication with the SeNB, and establishes a relay cellular communication link with a specific RUE in an LTE mobile communication system according to an embodiment of the present disclosure.
Figure 9B:
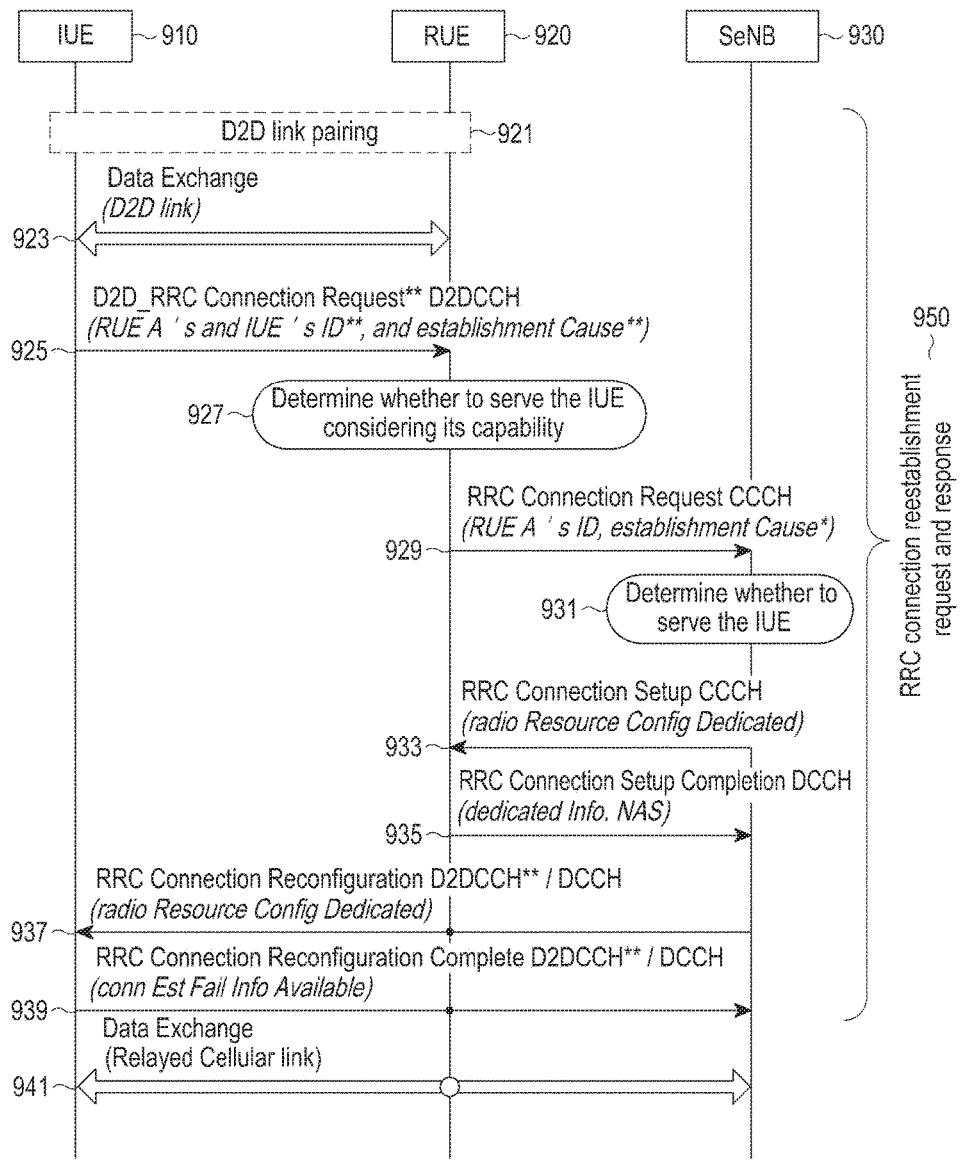

FIGS. 9A and 9B schematically illustrate a process in which an IUE moves out of a service coverage of an SeNB while performing direct communication with the SeNB, and establishes a relay cellular communication link with a specific RUE in an LTE mobile communication system according to an embodiment of the present disclosure.

Referring to FIGS. 9A and 9B, the LTE mobile communication system includes an IUE 910, an RUE 920, and an SeNB 930.

A process in which the IUE 910 moves out of a service coverage of the SeNB 930 while performing direct communication with the SeNB 930, and establishes a relay cellular communication link with a specific RUE, i.e., the RUE 920 illustrated in FIGS. 9A and 9B includes a measuring and reporting procedure 940 of the IUE 910 and a D2D communication link and relay cellular communication link establishing procedure 950 for the IUE 910. The measuring and reporting procedure 940 of the IUE 910 is similar to a measuring and reporting procedure 740 as described in FIG. 7, and a description thereof will be omitted herein. Here, the IUE 910 selects the RUE 920 as a candidate RUE using a D2D discovery operation, and performs a D2D link pairing operation with the RUE 920 upon receiving an RRC connection release message. The D2D communication link and relay cellular communication link establishing procedure 950 illustrated in FIGS. 9A and 9B is similar to a relay cellular communication link establishing and managing procedure 380 as described in FIGS. 3A and 3B, and a description thereof will be omitted herein.

Meanwhile, the IUE 910 has performed an authenticating procedure with a network already, so the IUE 910 does not perform additionally an authenticating procedure with the network.

Although FIGS. 9A and 9B illustrate a process in which an IUE moves out of a service coverage of an SeNB while performing direct communication with the SeNB, and establishes a relay cellular communication link with a specific RUE in an LTE mobile communication system according to an embodiment of the present disclosure, various changes could be made to FIGS. 9A and 9B. For example, although shown as a series of operations, various operations in FIGS. 9A and 9B could overlap, occur in parallel, occur in a different order, or occur multiple times.

A process in which an IUE moves out of a service coverage of an SeNB while performing direct communication with the SeNB, and establishes a relay cellular communication link with a specific RUE in an LTE mobile communication system according to an embodiment of the present disclosure has been described with reference to FIGS. 9A and 9B, and an environment that an IUE performs link change to another RUE which is at the same cell due to degradation of link quality with an existing RUE in an LTE mobile communication system according to an embodiment of the present disclosure will be described with reference to FIG. 10.

Figure 10:
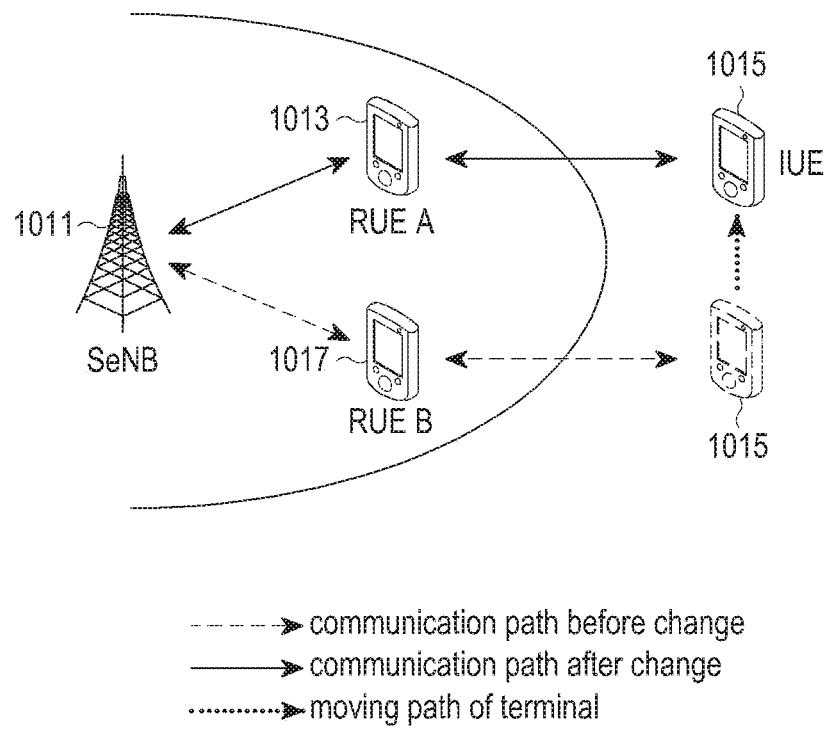
FIG. 10 schematically illustrates an environment that an IUE performs link change to another RUE which is at the same cell due to degradation of link quality with an existing RUE in an LTE mobile communication system according to an embodiment of the present disclosure.

FIG. 10 schematically illustrates an environment that an IUE performs link change to another RUE which is at the same cell due to degradation of link quality with an existing RUE in an LTE mobile communication system according to an embodiment of the present disclosure.

Referring to FIG. 10, the LTE mobile communication system includes an SeNB 1011, an RUE A 1013, an IUE 1015, and an RUE B 1017. In FIG. 10, the IUE 1015 performs link change to a new RUE which is at the same cell, i.e., the RUE A 103 according to degradation of quality of a link with an existing RUE, i.e., the RUE B 1017. In this case, the IUE 1015 performs change to a relay cellular link with another terminal in a general communication link (direct communication or relay cellular communication), so the IUE 1015 may use a D2D link and relay cellular link establishing procedure proposed in an embodiment of the present disclosure.

An environment that an IUE performs link change to another RUE which is at the same cell due to degradation of link quality with an existing RUE in an LTE mobile communication system according to an embodiment of the present disclosure has been described with reference to FIG. 10, and a process in which an IUE performs link change to another RUE which is at the same cell due to degradation of quality of a link with an existing RUE in an LTE mobile communication system according to an embodiment of the present disclosure will be described with reference to FIGS. 11A and 11B.

Figure 11A:
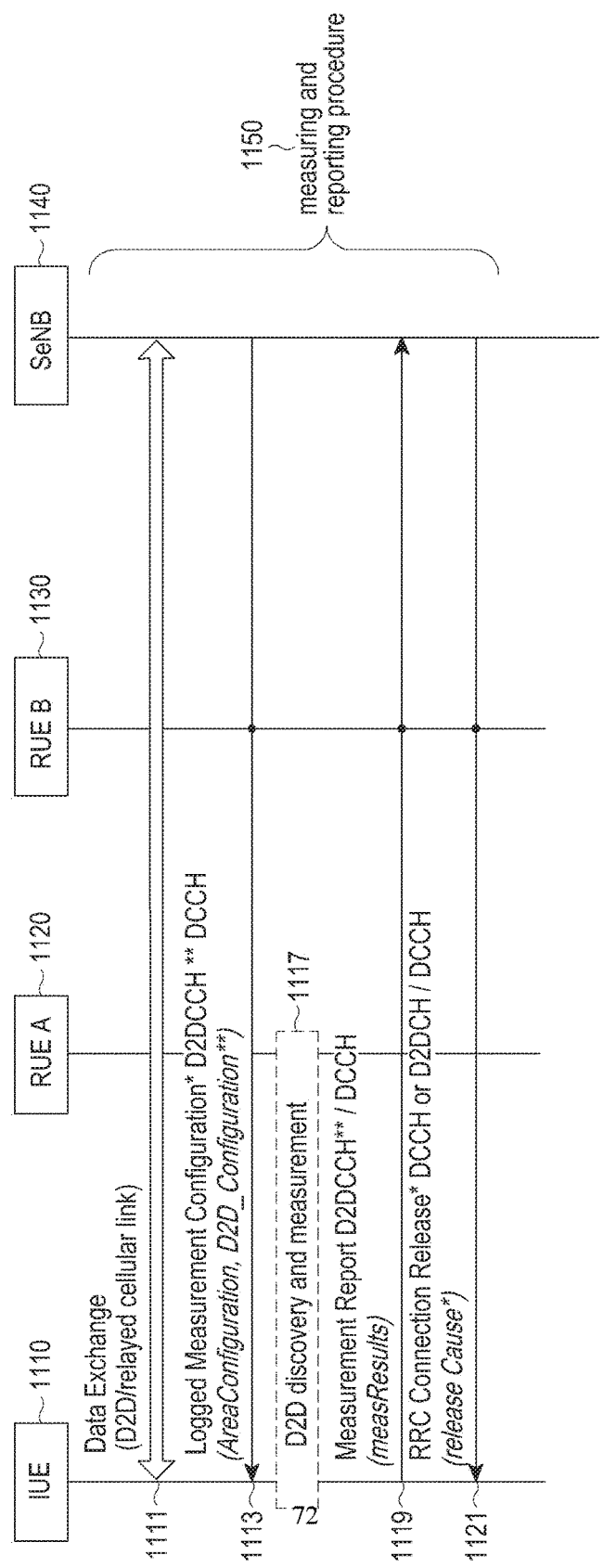
FIGS. 11A and 11B schematically illustrate a process in which an IUE performs link change to another RUE which is at the same cell due to degradation of quality of a link with an existing RUE in an LTE mobile communication system according to an embodiment of the present disclosure.
Figure 11B:
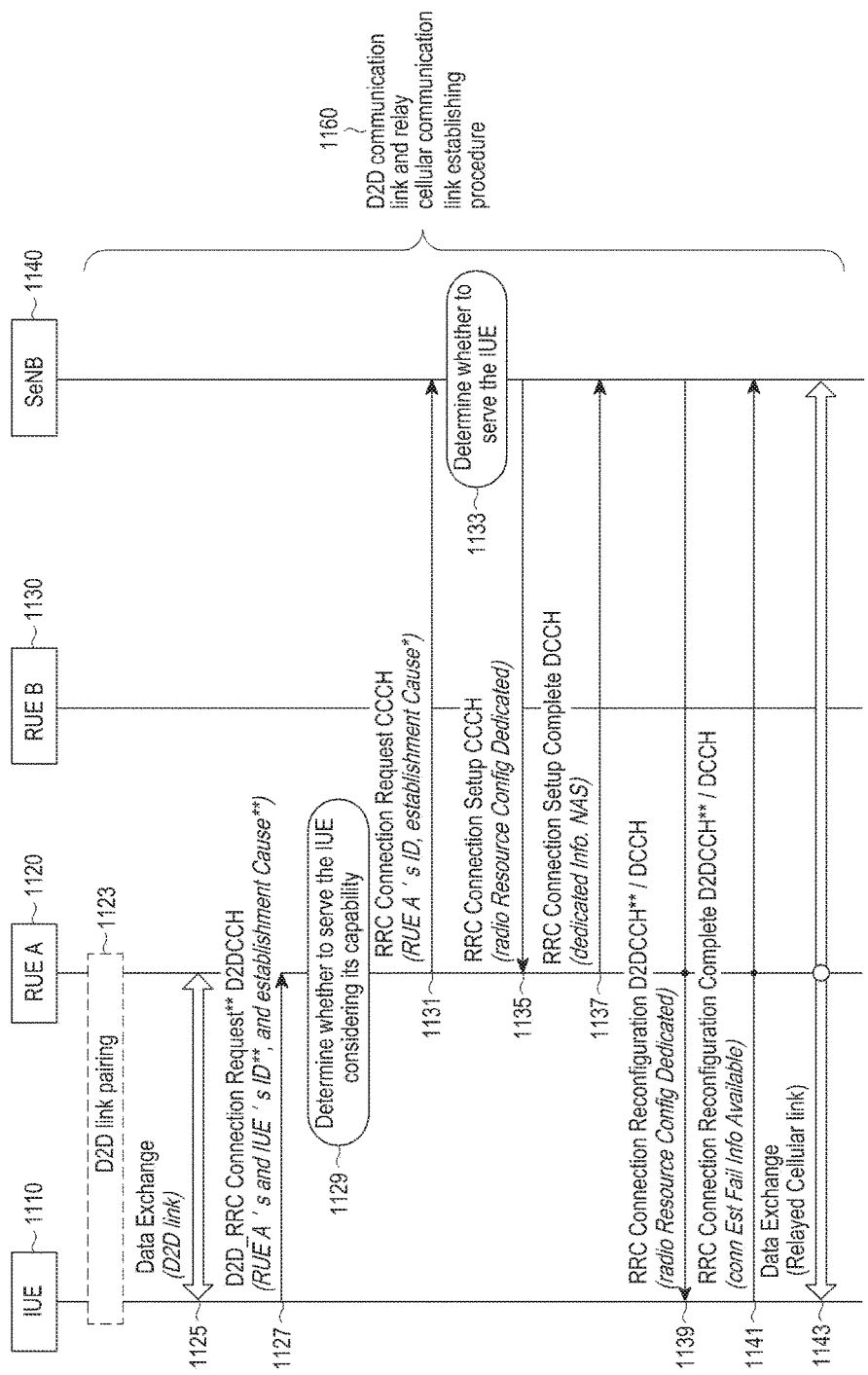

FIGS. 11A and 11B schematically illustrate a process in which an IUE performs link change to another RUE which is at the same cell due to degradation of quality of a link with an existing RUE in an LTE mobile communication system according to an embodiment of the present disclosure.

Referring to FIGS. 11A and 11B, the LTE mobile communication system includes an IUE 1110, an RUE A 1120, an RUE B 1130, and an SeNB 1140.

A process in which the IUE 1110 performs link change to another RUE which is at the same cell, i.e., the RUE A 1120 due to degradation of quality of a link with an existing RUE, i.e., the RUE B 1130 illustrated in FIGS. 11A and 11B includes a measuring and reporting procedure 1150 of the IUE 1110 and a D2D communication link and relay cellular communication link establishing procedure 1160 for the IUE 1110. The measuring and reporting procedure 1150 of the IUE 1110 is similar to a measuring and reporting procedure 740 as described in FIG. 7, and a description thereof will be omitted herein. Here, the IUE 1110 selects the RUE A 1120 as a candidate RUE using a D2D discovery operation, and performs a D2D link pairing operation with the RUE A 1120 upon receiving an RRC connection release message. The D2D communication link and relay cellular communication link establishing procedure 1160 illustrated in FIGS. 11A and 11B is similar to a relay cellular communication link establishing and managing procedure 380 as described in FIGS. 3A and 3B, and a description thereof will be omitted herein.

Meanwhile, the IUE 1110 has performed an authenticating procedure with a network already, so the IUE 1110 does not perform additionally an authenticating procedure with the network.

Although FIGS. 11A and 11B illustrate a process in which an IUE performs link change to another RUE which is at the same cell due to degradation of quality of a link with an existing RUE in an LTE mobile communication system according to an embodiment of the present disclosure, various changes could be made to FIGS. 11A and 11B. For example, although shown as a series of operations, various operations in FIGS. 11A and 11B could overlap, occur in parallel, occur in a different order, or occur multiple times.

A procedure for maintaining, managing, and changing a communication mode for maintaining, managing, and changing a communication link of an IUE according to an embodiment of the present disclosure in a case of assuming link change at the same cell has been described with reference to FIGS. 6 to 11b, and a procedure for maintaining, managing, and changing a communication mode for maintaining, managing, and changing a communication link of an IUE according to an embodiment of the present disclosure in a case of assuming link change to another cell will be described below.

An environment that an RUE which supports communication for an IUE moves out of a service coverage of another eNB in an LTE mobile communication system according to an embodiment of the present disclosure will be described with reference to FIG. 12.

Figure 12:
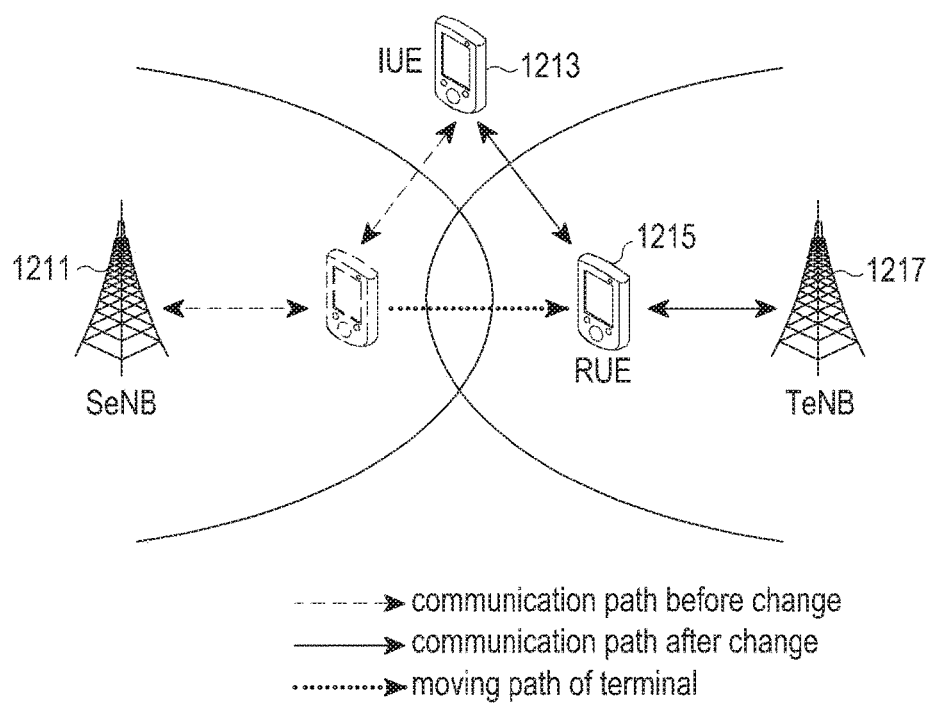
FIG. 12 schematically illustrates an environment that an RUE which supports communication for an IUE moves out of a service coverage of another eNB in an LTE mobile communication system according to an embodiment of the present disclosure.

FIG. 12 schematically illustrates an environment that an RUE which supports communication for an IUE moves out of a service coverage of another eNB in an LTE mobile communication system according to an embodiment of the present disclosure.

Referring to FIG. 12, the LTE mobile communication system includes an SeNB 1211, an IUE 1213, an RUE 1215, and a target eNB (TeNB) 1217. The RUE 1215 of the IUE 1213 moves into a service coverage of an eNB other than the SeNB 1211, i.e., the TeNB 1217, and performs a handover to the TeNB 1217, and the IUE 1213 maintains a cellular relay communication link with the RUE 1215.

Further, a handover procedure used in a general LTE mobile communication system may be extended and applied as a procedure in which the IUE 1213 maintains an existing link with the RUE 1215 or directly accesses a new eNB, i.e., the TeNB 1217. The RUE 1215 performs a handover to the TeNB 1217, and the IUE 1213 maintains a relay cellular link with the RUE 1215, and receives information for a new RRC connection reconfiguration from the TeNB 1217 to which the RUE 1215 performs the handover to reconfigure an RRC connection.

An environment that an RUE which supports communication for an IUE moves out of a service coverage of another eNB in an LTE mobile communication system according to an embodiment of the present disclosure has been described with reference to FIG. 12, and a process in which an IUE performs link change to another cell in an environment that an RUE which supports communication of the IUE moves out of a service coverage of another eNB in an LTE mobile communication system according to an embodiment of the present disclosure will be described with reference to FIGS. 13A and 13B.

Figure 13A:
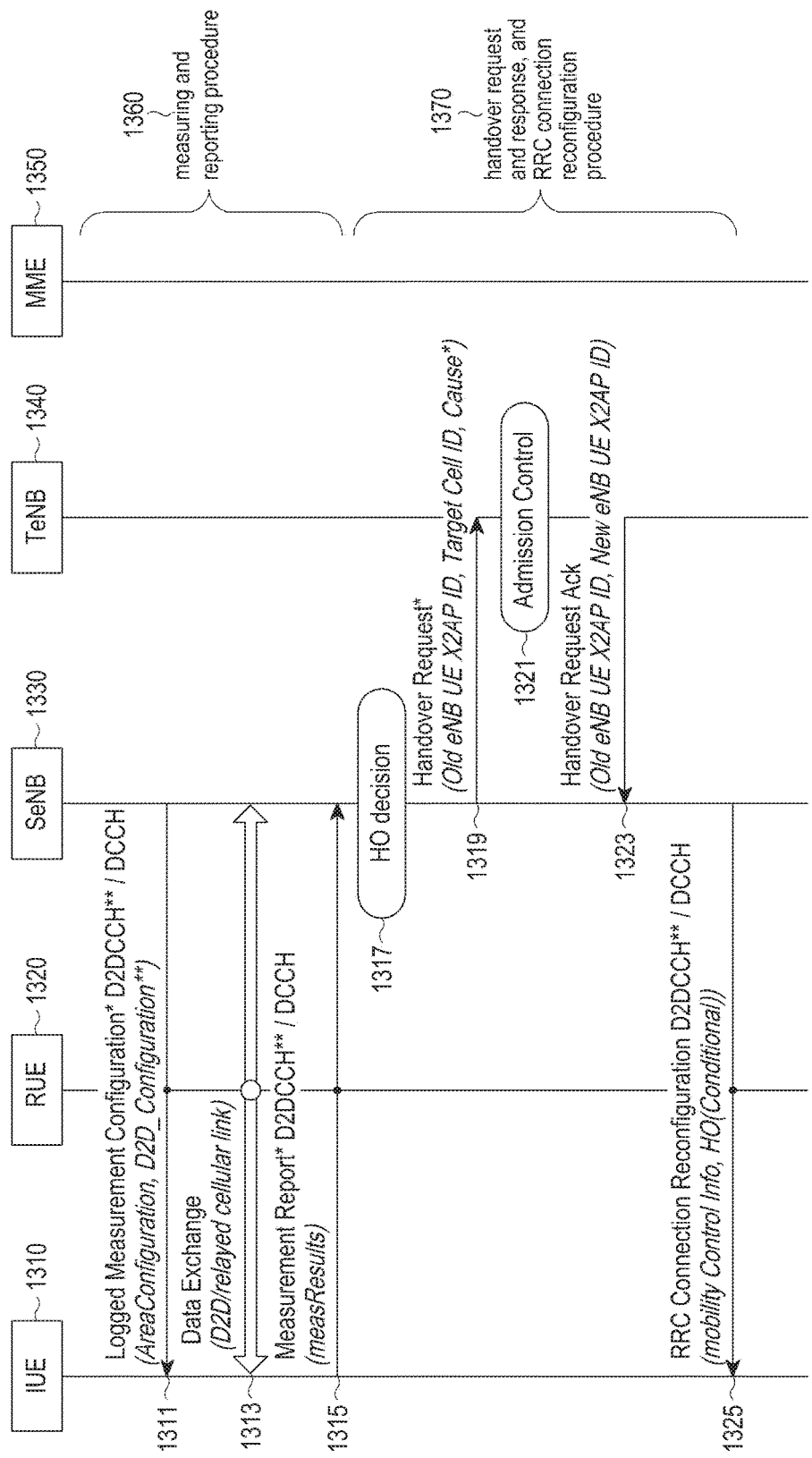
FIGS. 13A and 13B schematically illustrate a process in which an IUE performs link change to another cell in an environment that an RUE which supports communication of the IUE moves out of a service coverage of another eNB in an LTE mobile communication system according to an embodiment of the present disclosure.
Figure 13B:
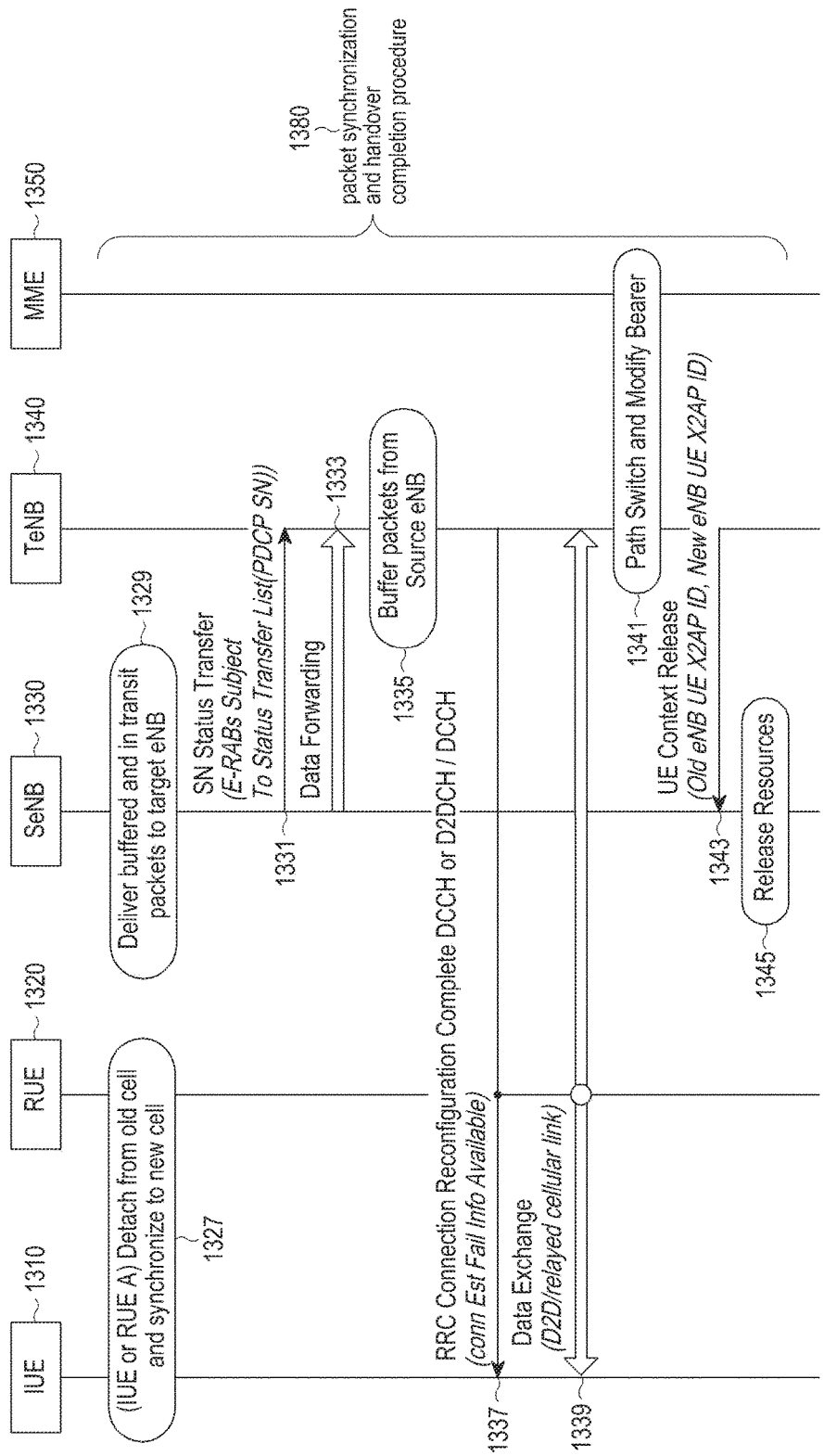

FIGS. 13A and 13B schematically illustrate a process in which an IUE performs link change to another cell in an environment that an RUE which supports communication of the IUE moves out of a service coverage of another eNB in an LTE mobile communication system according to an embodiment of the present disclosure.

Referring to FIGS. 13A and 13B, the LTE mobile communication system includes an IUE 1310, an RUE 1320, an SeNB 1330, a TeNB 1340, and an MME 1350.

The RUE 1320 of the IUE 1310 moves into a service coverage of another eNB, i.e., the TeNB 1340, and performs a handover to the TeNB 1340, and the IUE 1310 maintains a cellular relay communication link with the RUE 1320. Further, a handover procedure used in a general LTE mobile communication system may be extended and applied as a procedure in which the IUE 1310 maintains an existing link with the RUE 1320 or directly accesses the TeNB 1340. The RUE 1320 performs a handover to the TeNB 1340, and the IUE 1310 maintains a relay cellular link with the RUE 1320, and receives information for a new RRC connection reconfiguration from the TeNB 1340 to which the RUE 1320 performs the handover to reconfigure an RRC connection.

A process in which an IUE performs link change to another cell in an environment that an RUE which supports communication of the IUE moves out of a service coverage of another eNB in an LTE mobile communication system according to an embodiment of the present disclosure as illustrated in FIGS. 13A and 13B includes a measuring and reporting procedure 1360 of the IUE 1310, a handover request and response, and RRC connection reconfiguration procedure 1370 through the SeNB 1330 and the TeNB 1340, and a packet synchronization and handover completion procedure 1380 after link change of the RUE 1320 or the IUE 1310.

Firstly, the measuring and reporting procedure 1360 is similar to a measuring and reporting procedure 740 as described in FIG. 7, and a description thereof will be omitted herein.

Secondly, the handover request and response, and RRC connection reconfiguration procedure 1370 through the SeNB 1330 and the TeNB 1340 will be described below.

The SeNB 1330 determines that there is a need for a handover for the IUE 1310 or the RUE 1320 based on a measured result included in a measurement report message received from the RUE 1320 at operation 1317. So, the SeNB 1330 transmits a handover request message to the TeNB 1340 at operation 1319, and the TeNB 1340 controls to accept the handover for the IUE 1310 or the RUE 1320 based on the handover request message at operation 1321, and transmits a handover request ack message as a response message to the handover request message to the SeNB 1330 at operation 1323.

The handover request message and the handover request ack message are transmitted and received between an SeNB and a TeNB for determining whether to perform a handover of a UE in a general LTE mobile communication system. An embodiment of the present disclosure includes a D2D_handover field with a preset bit-size, e.g., a 2 bit-size into a cause IE included in a handover request message used in a general LTE mobile communication system to additionally indicate a reason for handover request for an IUE. If a field value of the D2D_handover field is set to '00', the D2D_handover field indicates that it is not for handover request for an IUE. If a field value of the D2D_handover field is set to '01', the D2D_handover field indicates that it is for handover request for an IUE in a normal environment. If a field value of the D2D_handover field is set to '10', the D2D_handover field indicates that it is for handover request for an IUE in a disaster environment. The TeNB 1340 includes information on an RRC connection which will be used by the IUE 1310 or the RUE 1320 in a service coverage of the TeNB 1340 into the handover request ack message to transmit the handover request ack message. After receiving the handover request ack message, the SeNB 1330 transmits an RRC connection reconfiguration message to the IUE 1310 or the RUE 1320 to inform resource information for an RRC connection received from the TeNB 1340 to a corresponding UE at operation 1325.

Thirdly, the packet synchronization and handover completion procedure 1380 after link change of the RUE 1320 or the IUE 1310 will be described below.

After receiving the RRC connection reconfiguration message from the SeNB 1330, the IUE 1310 or the RUE 1320 releases an existing RRC connection with the SeNB 1330, and performs a synchronization operation with the TeNB 1340 at operation 1327. The SeNB 1330 transmits packet information which is being transmitted to the IUE 1310 or the RUE 1320 to the TeNB 1340 to support packet synchronization for the TeNB 1340 at operations 1329, 1331, and 1333. After the packet synchronization process, the IUE 1310 or the RUE 1320 informs to the TeNB 1340 that a handover has been completed by transmitting an RRC connection reconfiguration complete message to the TeNB 1340 at operation 1337, and performs relay cellular communication with the TeNB 1340 through the RUE 1320 or direct cellular communication with the TeNB 1340 at operations 1339 and 1341. The TeNB 1340 transmits a UE context release message to the SeNB 1330 at operation 1343, so the SeNB 1330 releases a radio resource which has been allocated to the IUE 1310 or the RUE 1320 which has performed the handover at operation 1345.

Although FIGS. 13A and 13B illustrate a process in which an IUE performs link change to another cell in an environment that an RUE which supports communication of the IUE moves out of a service coverage of another eNB in an LTE mobile communication system according to an embodiment of the present disclosure, various changes could be made to FIGS. 13A and 13B. For example, although shown as a series of operations, various operations in FIGS. 13A and 13B could overlap, occur in parallel, occur in a different order, or occur multiple times.

A process in which an IUE performs link change to another cell in an environment that an RUE which supports communication of the IUE moves out of a service coverage of another eNB in an LTE mobile communication system according to an embodiment of the present disclosure has been described with reference to FIGS. 13A and 13B, and an environment that an IUE moves into a service coverage of a TeNB while performing relay cellular communication through an RUE which is in a service coverage of an SeNB at outside of a service coverage of a cellular system in an LTE mobile communication system according to an embodiment of the present disclosure will be described with reference to FIG. 14.

Figure 14:
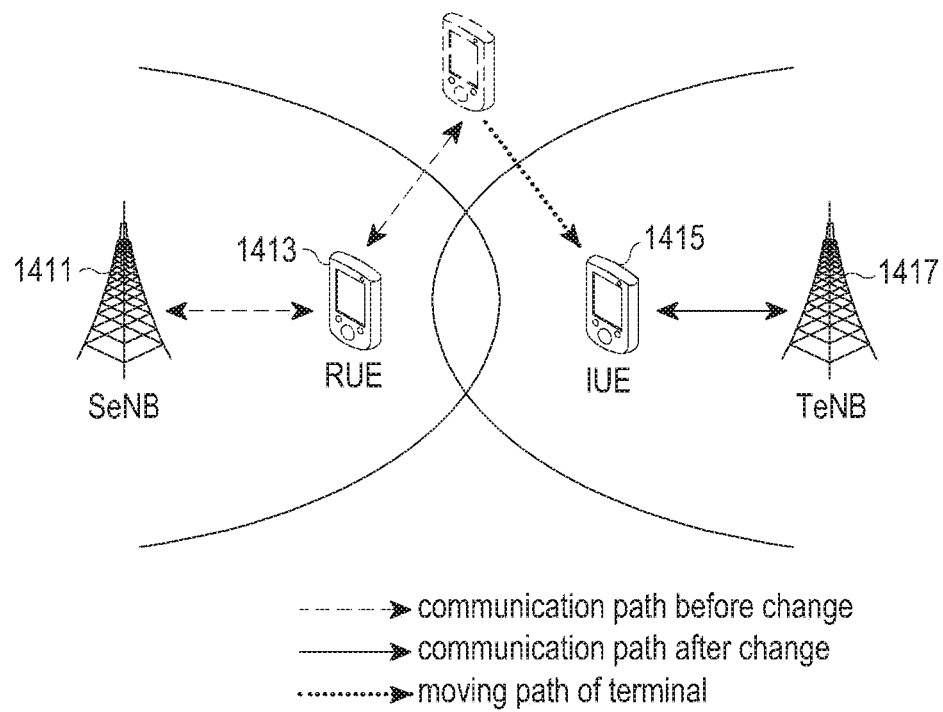
FIG. 14 schematically illustrates an environment that an IUE moves into a service coverage of a TeNB while performing relay cellular communication through an RUE which is in a service coverage of an SeNB at outside of a service coverage of a cellular system in an LTE mobile communication system according to an embodiment of the present disclosure.

FIG. 14 schematically illustrates an environment that an IUE moves into a service coverage of a TeNB while performing relay cellular communication through an RUE which is in a service coverage of an SeNB at outside of a service coverage of a cellular system in an LTE mobile communication system according to an embodiment of the present disclosure.

Referring to FIG. 14, the LTE mobile communication system includes an SeNB 1411, an RUE 1413, an IUE 1415, and a TeNB 1417. The IUE 1415 moves into a service coverage of the TeNB 1417 while performing relay cellular communication through the RUE 1413 which is in a service coverage of the SeNB 1411 at outside of a service coverage of a cellular system, and performs a handover to the TeNB 1417. That is, the IUE 1415 releases an existing D2D link and an existing relay cellular link with the RUE 1413, and performs link change to the TeNB 1417.

An environment that an IUE moves into a service coverage of a TeNB while performing relay cellular communication through an RUE which is in a service coverage of an SeNB at outside of a service coverage of a cellular system in an LTE mobile communication system according to an embodiment of the present disclosure has been described with reference to FIG. 14, and a process in which an IUE performs link change to another cell in an environment that the IUE moves into a service coverage of a TeNB while performing relay cellular communication through an RUE which is in a service coverage of an SeNB at outside of a service coverage of a cellular system in an LTE mobile communication system according to an embodiment of the present disclosure will be described with reference to FIGS. 15A and 15B.

Figure 15A:
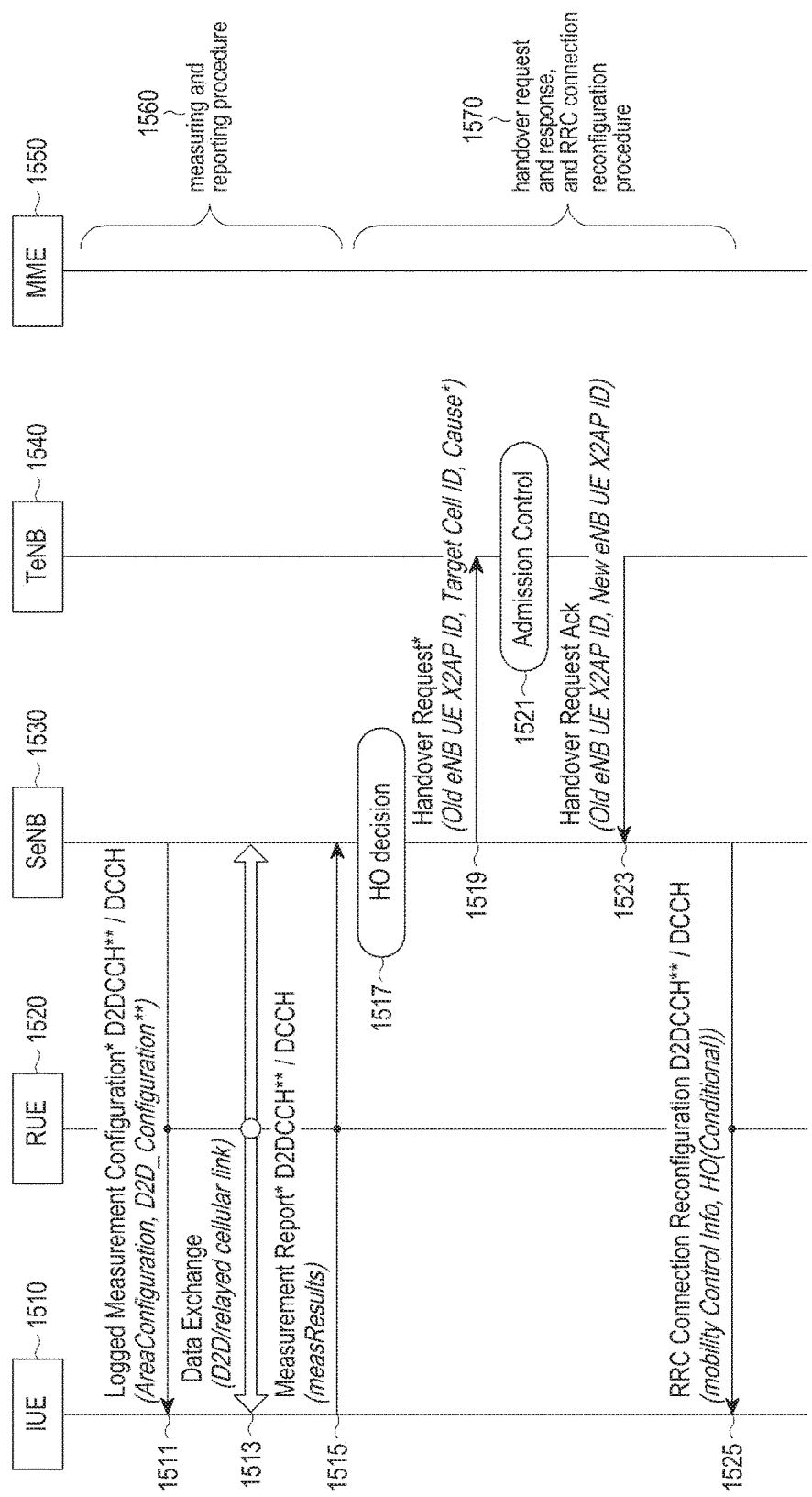
FIGS. 15A and 15B schematically illustrate a process in which an IUE performs link change to another cell in an environment that the IUE moves into a service coverage of a TeNB while performing relay cellular communication through an RUE which is in a service coverage of an SeNB at outside of a service coverage of a cellular system in an LTE mobile communication system according to an embodiment of the present disclosure.
Figure 15B:
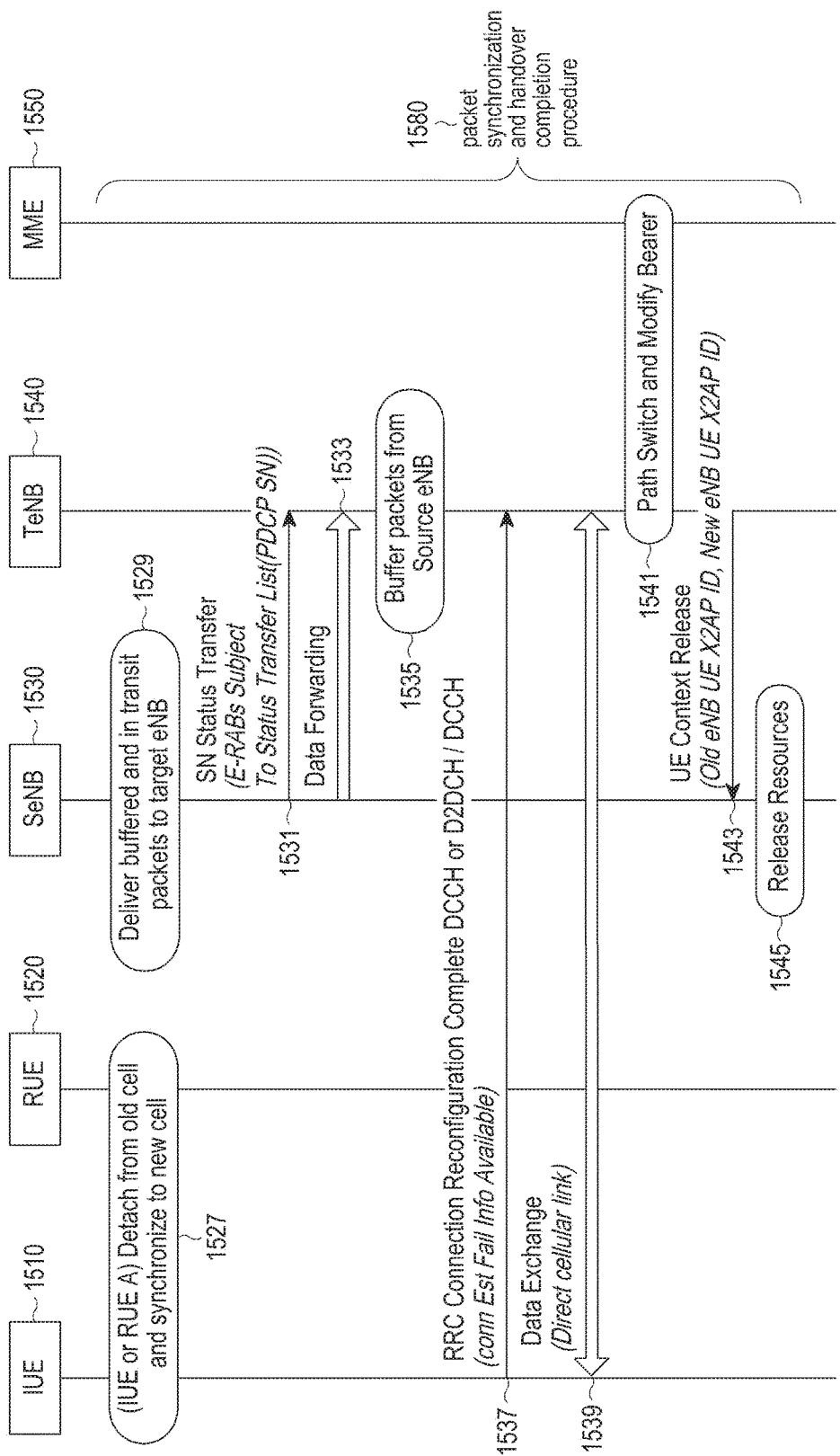

FIGS. 15A and 15B schematically illustrate a process in which an IUE performs link change to another cell in an environment that the IUE moves into a service coverage of a TeNB while performing relay cellular communication through an RUE which is in a service coverage of an SeNB at outside of a service coverage of a cellular system in an LTE mobile communication system according to an embodiment of the present disclosure.

Referring to FIGS. 15A and 15B, the LTE mobile communication system includes an IUE 1510, an RUE 1520, an SeNB 1530, a TeNB 1540, and an MME 1550.

The IUE 1510 moves into a service coverage of the TeNB 1540 while performing relay cellular communication through the RUE 1520 which is in a service coverage of the SeNB 1530 at outside of a service coverage of a cellular system, and performs a handover to the TeNB 1540. Further, a handover procedure used in a general LTE mobile communication system may be extended and applied as a procedure in which the IUE 1510 maintains an existing link with the RUE 1520 or directly accesses the TeNB 1540. The IUE 1510 releases an existing D2D link and an existing relay cellular link with the RUE 1520, and performs link change to the TeNB 1540.

A process in which an IUE performs link change to another cell in an environment that the IUE moves into a service coverage of a TeNB while performing relay cellular communication through an RUE which is in a service coverage of an SeNB at outside of a service coverage of a cellular system in an LTE mobile communication system according to an embodiment of the present disclosure as illustrated in FIGS. 15A and 15B includes a measuring and reporting procedure 1560 of the IUE 1510, a handover request and response, and RRC connection reconfiguration procedure 1570 through the SeNB 1530 and the TeNB 1540, and a packet synchronization and handover completion procedure 1580 after link change of the RUE 1520 or the IUE 1510.

Firstly, the measuring and reporting procedure 1560 is similar to a measuring and reporting procedure 740 as described in FIG. 7, and a description thereof will be omitted herein.

Secondly, the handover request and response, and RRC connection reconfiguration procedure 1570 through the SeNB 1530 and the TeNB 1540 will be described below.

The SeNB 1330 determines that there is a need for a handover for the IUE 1510 or the RUE 1520 based on a measured result included in a measurement report message received from the RUE 1520 at operation 1517. So, the SeNB 1530 transmits a handover request message to the TeNB 1540 at operation 1519, and the TeNB 1540 controls to accept the handover for the IUE 1510 or the RUE 1520 based on the handover request message at operation 1521, and transmits a handover request ack message as a response message to the handover request message to the SeNB 1530 at operation 1523.

The handover request message and the handover request ack message are transmitted and received between an SeNB and a TeNB for determining whether to perform a handover of a UE in a general LTE mobile communication system. An embodiment of the present disclosure includes a D2D_handover field with a preset bit-size, e.g., a 2 bit-size into a cause IE included in a handover request message used in a general LTE mobile communication system to additionally indicate a reason for handover request for an IUE. If a field value of the D2D_handover field is set to '00', the D2D_handover field indicates that it is not for handover request for an IUE. If a field value of the D2D_handover field is set to '01', the D2D_handover field indicates that it is for handover request for an IUE in a normal environment. If a field value of the D2D_handover field is set to '10', the D2D_handover field indicates that it is for handover request for an IUE in a disaster environment. The TeNB 1540 includes information on an RRC connection which will be used by the IUE 1510 or the RUE 1520 in a service coverage of the TeNB 1540 into the handover request ack message to transmit the handover request ack message. After receiving the handover request ack message, the SeNB 1530 transmits an RRC connection reconfiguration message to the IUE 1510 or the RUE 1520 to inform resource information for an RRC connection received from the TeNB 1540 to a corresponding UE at operation 1525.

Thirdly, the packet synchronization and handover completion procedure 1580 after link change of the RUE 1520 or the IUE 1510 will be described below.

After receiving the RRC connection reconfiguration message from the SeNB 1530, the IUE 1510 or the RUE 1520 releases an existing RRC connection with the SeNB 1530, and performs a synchronization operation with the TeNB 1540 at operation 1527. The SeNB 1530 transmits packet information which is being transmitted to the IUE 1510 or the RUE 1520 to the TeNB 1540 to support packet synchronization for the TeNB 1540 at operations 1529, 1531, and 1533. After the packet synchronization process, the IUE 1510 or the RUE 1520 informs to the TeNB 1540 that a handover has been completed by transmitting an RRC connection reconfiguration complete message to the TeNB 1540 at operation 1537, and performs relay cellular communication with the TeNB 1540 through the RUE 1520 or direct cellular communication with the TeNB 1540 at operations 1539 and 1541. The TeNB 1540 transmits a UE context release message to the SeNB 1530 at operation 1543, so the SeNB 1530 releases a radio resource which has been allocated to the IUE 1510 or the RUE 1520 which has performed the handover at operation 1545.

Although FIGS. 15A and 15B illustrate a process in which an IUE performs link change to another cell in an environment that the IUE moves into a service coverage of a TeNB while performing relay cellular communication through an RUE which is in a service coverage of an SeNB at outside of a service coverage of a cellular system in an LTE mobile communication system according to an embodiment of the present disclosure, various changes could be made to FIGS. 15A and 15B. For example, although shown as a series of operations, various operations in FIGS. 15A and 15B could overlap, occur in parallel, occur in a different order, or occur multiple times.

A process in which an IUE performs link change to another cell in an environment that the IUE moves into a service coverage of a TeNB while performing relay cellular communication through an RUE which is in a service coverage of an SeNB at outside of a service coverage of a cellular system in an LTE mobile communication system according to an embodiment of the present disclosure has been described with reference to FIGS. 15A and 15B, and an environment that an IUE moves out of a service coverage of an SeNB while performing direct communication with the SeNB in an LTE mobile communication system according to an embodiment of the present disclosure will be described with reference to FIG. 16.

Figure 16:
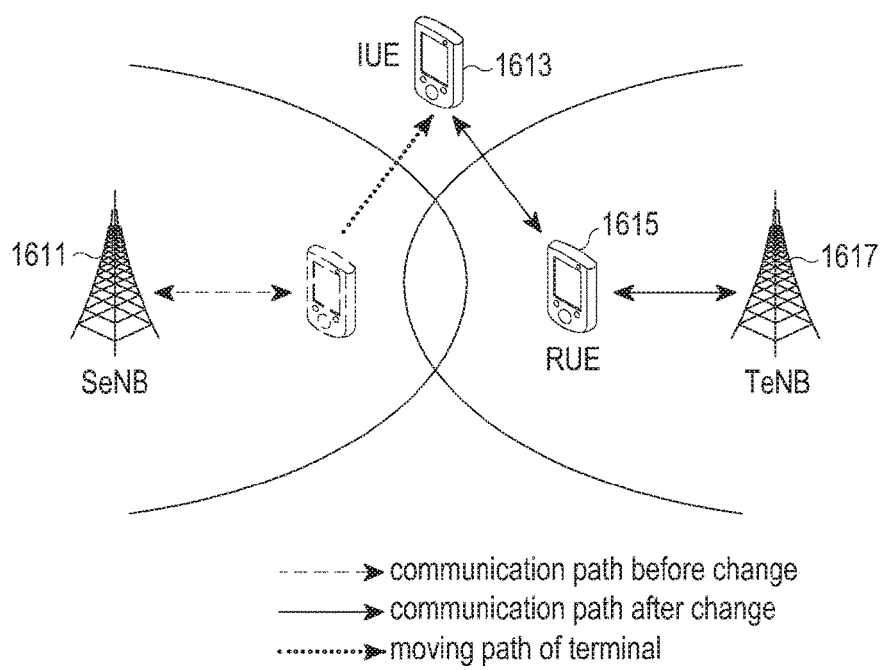
FIG. 16 schematically illustrates an environment that an IUE moves out of a service coverage of an SeNB while performing direct communication with the SeNB in an LTE mobile communication system according to an embodiment of the present disclosure.

FIG. 16 schematically illustrates an environment that an IUE moves out of a service coverage of an SeNB while performing direct communication with the SeNB in an LTE mobile communication system according to an embodiment of the present disclosure.

Referring to FIG. 16, the LTE mobile communication system includes an SeNB 1611, an IUE 1613, an RUE 1615, and a TeNB 1617. The IUE 1613 moves out of a service coverage of the SeNB 1611 while performing direct communication with the SeNB 1611, so the IUE 1613 establishes a D2D link and a relay cellular link with the RUE 1615 which is within a service coverage of the TeNB 1617. That is, the IUE 1613 performs relay link change to the RUE 1615 which is within the service coverage of the TeNB 1617 due to degradation of quality of a link with the SeNB 1611. After a cellular communication link with the SeNB 1611 is terminated, the IUE 1613 performs link change to the TeNB 1617 by performing a procedure for establishing a D2D link and a relay cellular link for the RUE 1615 with the TeNB 1617.

An environment that an IUE moves out of a service coverage of an SeNB while performing direct communication with the SeNB in an LTE mobile communication system according to an embodiment of the present disclosure has been described with reference to FIG. 16, and a process in which an IUE performs link change to another cell in an environment that the IUE moves out of a service coverage of an SeNB while performing direct communication with the SeNB in an LTE mobile communication system according to an embodiment of the present disclosure will be described with reference to FIGS. 17A and 17B.

Figure 17A:
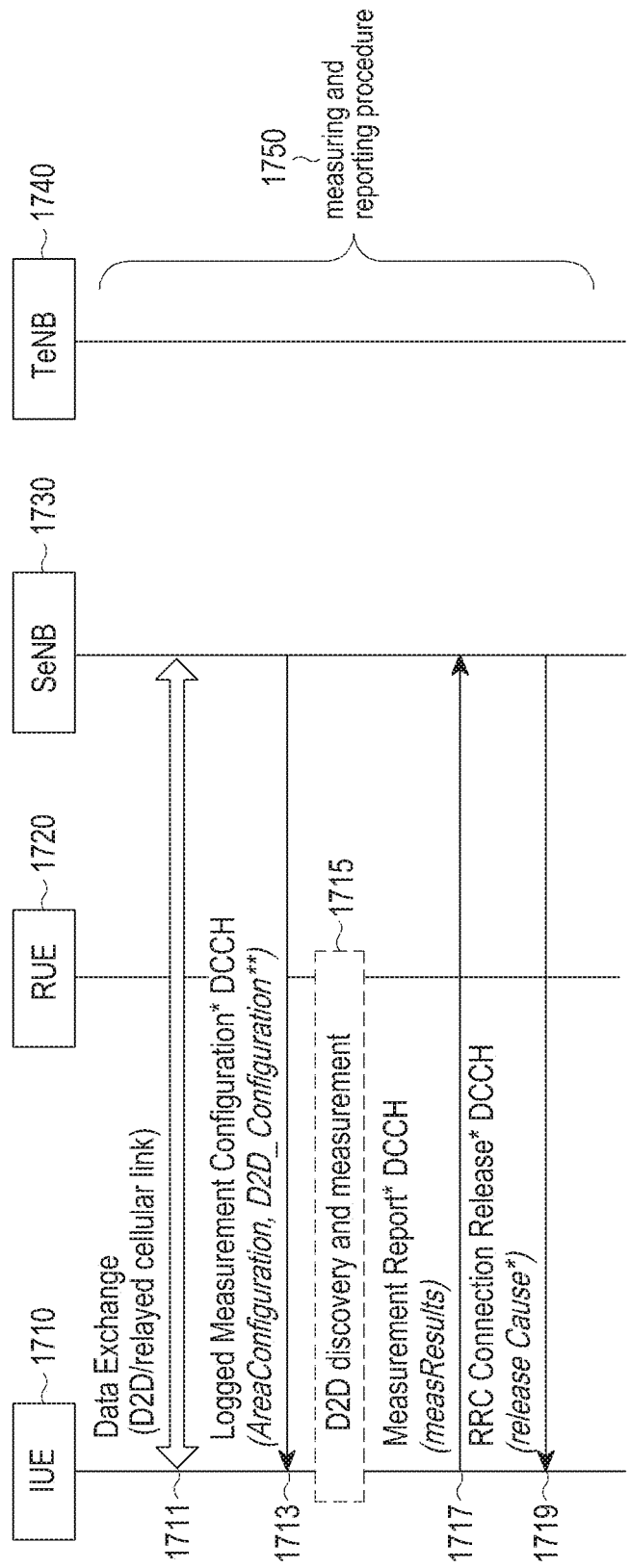
FIGS. 17A and 17B schematically illustrate a process in which an IUE performs link change to another cell in an environment that the IUE moves out of a service coverage of an SeNB while performing direct communication with the SeNB in an LTE mobile communication system according to an embodiment of the present disclosure.
Figure 17B:
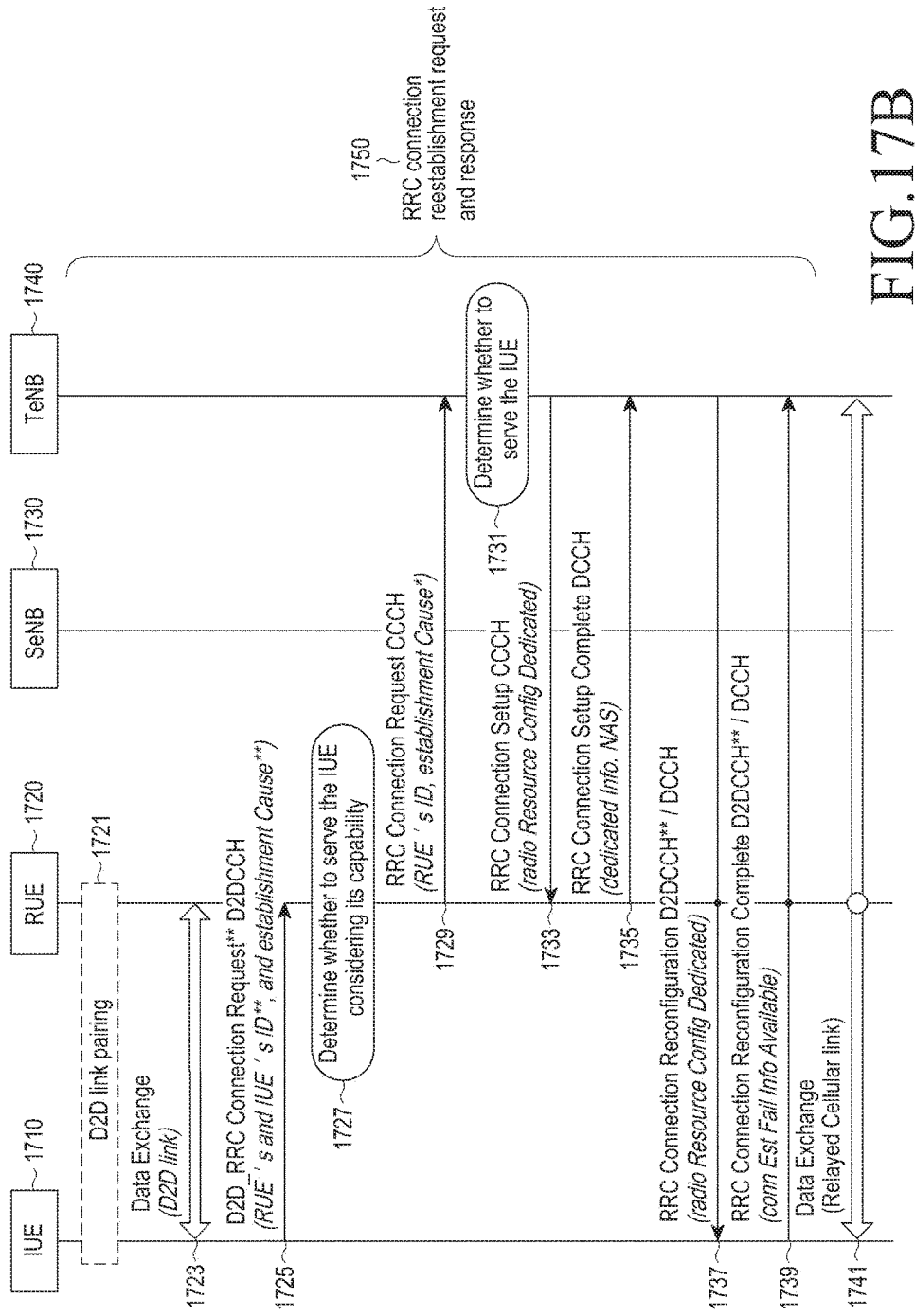

FIGS. 17A and 17B schematically illustrate a process in which an IUE performs link change to another cell in an environment that the IUE moves out of a service coverage of an SeNB while performing direct communication with the SeNB in an LTE mobile communication system according to an embodiment of the present disclosure.

Referring to FIGS. 17A and 17B, the LTE mobile communication system includes an IUE 1710, an RUE 1720, an SeNB 1730, and a TeNB 1740.

The IUE 1710 moves out of a service coverage of the SeNB 1730 while performing direct communication with the SeNB 1730, so the IUE 1710 establishes a D2D link and a relay cellular link with the RUE 1720 which is within a service coverage of the TeNB 1740. That is, the IUE 1710 performs relay link change to the RUE 1720 which is within the service coverage of the TeNB 1740 due to degradation of quality of a link with the SeNB 1730. After a cellular communication link with the SeNB 1730 is terminated, the IUE 1710 performs link change to the TeNB 1740 by performing a procedure for establishing a D2D link and a relay cellular link for the RUE 1720 with the TeNB 1740.

A process in which an IUE performs link change to another cell in an environment that the IUE moves out of a service coverage of an SeNB while performing direct communication with the SeNB in an LTE mobile communication system according to an embodiment of the present disclosure as illustrated in FIGS. 17A and 17B includes a measuring and reporting procedure 1750, and a D2D link and relay cellular link establishing procedure 1760 The measuring and reporting procedure 1750 is similar to a measuring and reporting procedure 1150 as described in FIGS. 11A and 11B, the D2D link and relay cellular link establishing procedure 1760 is similar to a D2D communication link and relay cellular communication link establishing procedure 1160 as described in FIGS. 11A and 11B, and a description thereof will be omitted herein.

Although FIGS. 17A and 17B illustrate a process in which an IUE performs link change to another cell in an environment that the IUE moves out of a service coverage of an SeNB while performing direct communication with the SeNB in an LTE mobile communication system according to an embodiment of the present disclosure, various changes could be made to FIGS. 17A and 17B. For example, although shown as a series of operations, various operations in FIGS. 17A and 17B could overlap, occur in parallel, occur in a different order, or occur multiple times.

A process in which an IUE performs link change to another cell in an environment that the IUE moves out of a service coverage of an SeNB while performing direct communication with the SeNB in an LTE mobile communication system according to an embodiment of the present disclosure has been described with reference to FIGS. 17A and 17B, and an environment that an IUE establishes a D2D link and a relay cellular link with an RUE which is within a service coverage of a TeNB due to degradation of quality of a corresponding link while performing relay communication through an RUE which is within a service coverage of an SeNB in an LTE mobile communication system according to an embodiment of the present disclosure will be described with reference to FIG. 18.

Figure 18:
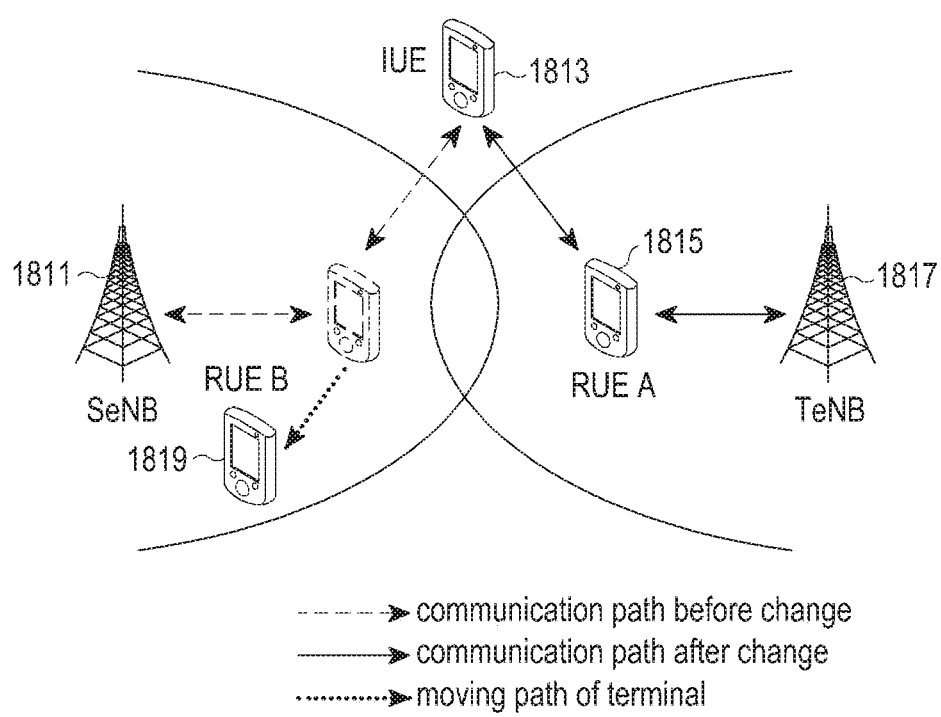
FIG. 18 schematically illustrates an environment that an IUE establishes a D2D link and a relay cellular link with an RUE which is within a service coverage of a TeNB due to degradation of quality of a corresponding link while performing relay communication through an RUE which is within a service coverage of an SeNB in an LTE mobile communication system according to an embodiment of the present disclosure.

FIG. 18 schematically illustrates an environment that an IUE establishes a D2D link and a relay cellular link with an RUE which is within a service coverage of a TeNB due to degradation of quality of a corresponding link while performing relay communication through an RUE which is within a service coverage of an SeNB in an LTE mobile communication system according to an embodiment of the present disclosure.

Referring to FIG. 18, the LTE mobile communication system includes an SeNB 1811, an IUE 1813, an RUE A 1815, a TeNB 1817, and an RUE B 1819. The IUE 1813 establishes a D2D link and a relay cellular link with the RUE A 1815 which is within a service coverage of the TeNB 1817 due to degradation of quality of a corresponding link while performing relay communication through the RUE B 1819 which is within a service coverage of the SeNB 1811. That is, the IUE 1813 performs relay link change to the RUE A 1815 which is within the service coverage of the TeNB 1817 due to degradation of quality of a link with the SeNB 1811. After a cellular communication link with the SeNB 1811 is terminated, the IUE 1813 performs link change to the TeNB 1817 by performing a procedure for establishing a D2D link and a relay cellular link for the RUE A 1815 with the TeNB 1817.

An environment that an IUE establishes a D2D link and a relay cellular link with an RUE which is within a service coverage of a TeNB due to degradation of quality of a corresponding link while performing relay communication through an RUE which is within a service coverage of an SeNB in an LTE mobile communication system according to an embodiment of the present disclosure has been described with reference to FIG. 18, and a process in which an IUE performs link change to another cell in an environment that the IUE establishes a D2D link and a relay cellular link with an RUE which is within a service coverage of a TeNB due to degradation of quality of a corresponding link while performing relay communication through an RUE which is within a service coverage of an SeNB in an LTE mobile communication system according to an embodiment of the present disclosure will be described with reference to FIGS. 19A and 19B.

Figure 19A:
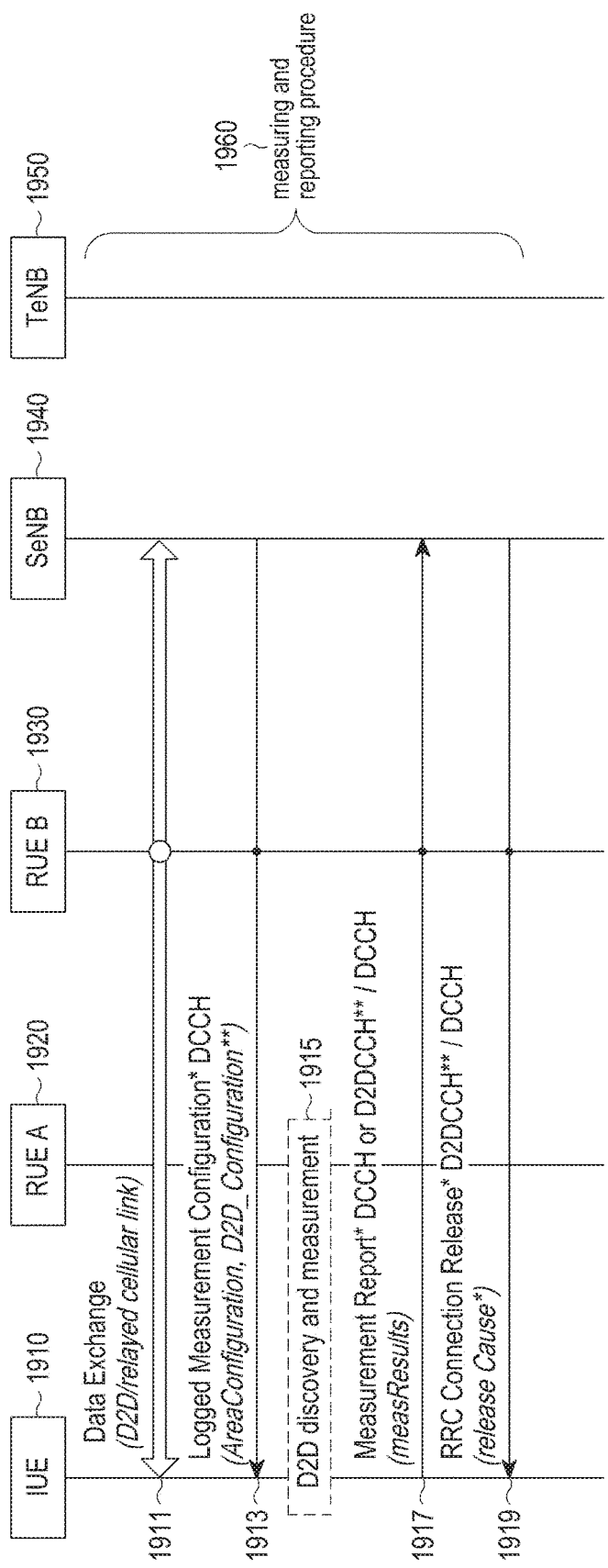
FIGS. 19A and 19B schematically illustrate a process in which an IUE performs link change to another cell in an environment that the IUE establishes a D2D link and a relay cellular link with an RUE which is within a service coverage of a TeNB due to degradation of quality of a corresponding link while performing relay communication through an RUE which is within a service coverage of an SeNB in an LTE mobile communication system according to an embodiment of the present disclosure.
Figure 19B:
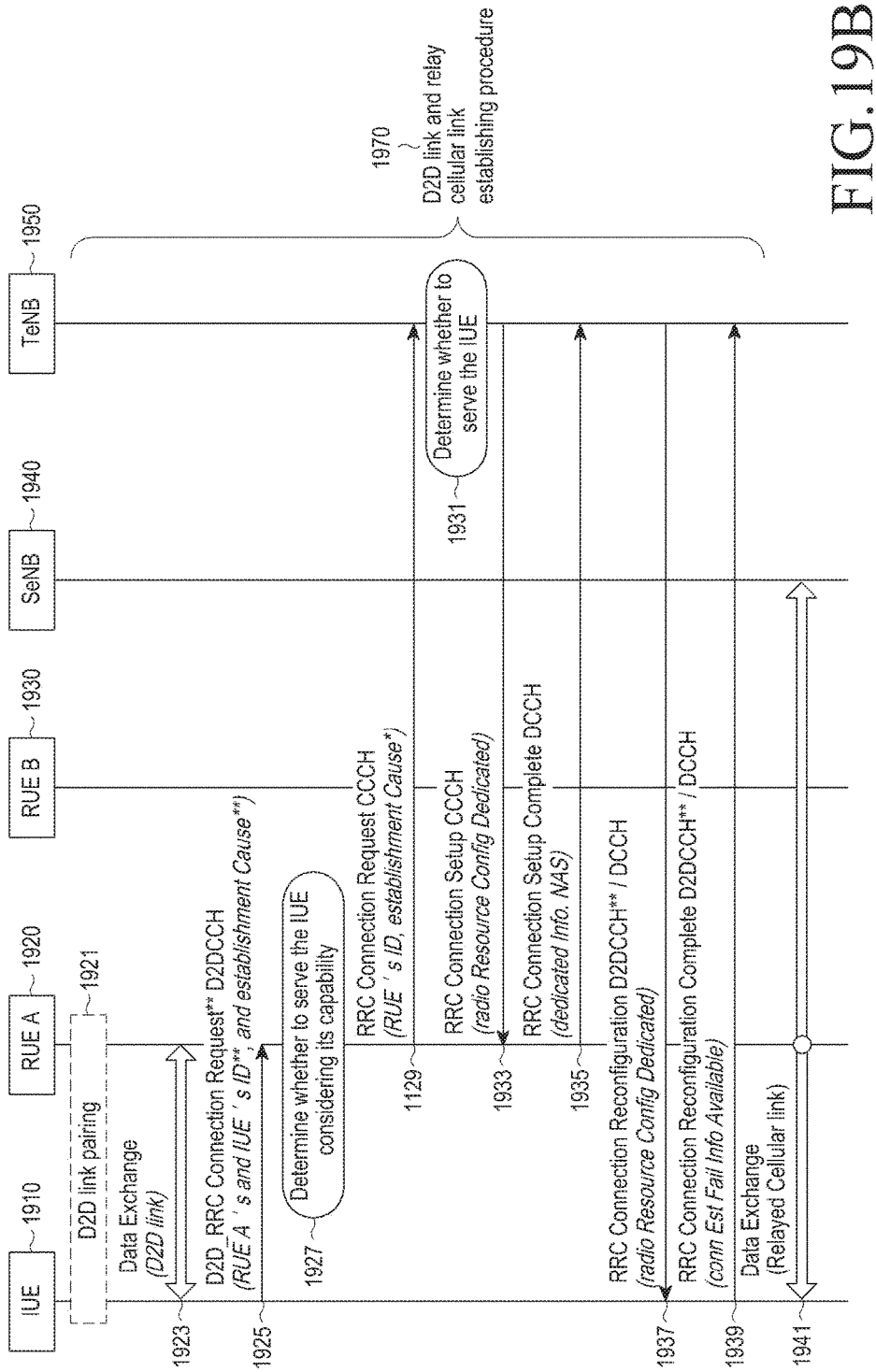

FIGS. 19A and 19B schematically illustrate a process in which an IUE performs link change to another cell in an environment that the IUE establishes a D2D link and a relay cellular link with an RUE which is within a service coverage of a TeNB due to degradation of quality of a corresponding link while performing relay communication through an RUE which is within a service coverage of an SeNB in an LTE mobile communication system according to an embodiment of the present disclosure.

Referring to FIGS. 19A and 19B, the LTE mobile communication system includes an IUE 1910, an RUE A 1920, an RUE B 1930, an SeNB 1940, and a TeNB 1950.

The IUE 1920 establishes a D2D link and a relay cellular link with the RUE A 1920 which is within a service coverage of the TeNB 1950 due to degradation of quality of a corresponding link while performing relay communication through the RUE B 1930 which is within a service coverage of the SeNB 1940. That is, the IUE 1910 performs relay link change to the RUE A 1920 which is within the service coverage of the TeNB 1950 due to degradation of quality of a link with the SeNB 1940. After a cellular communication link with the SeNB 1940 is terminated, the IUE 1910 performs link change to the TeNB 1950 by performing a procedure for establishing a D2D link and a relay cellular link for the RUE A 1920 with the TeNB 1950.

A process in which an IUE performs link change to another cell in an environment that the IUE establishes a D2D link and a relay cellular link with an RUE which is within a service coverage of a TeNB due to degradation of quality of a corresponding link while performing relay communication through an RUE which is within a service coverage of an SeNB in an LTE mobile communication system according to an embodiment of the present disclosure as illustrated in FIGS. 19A and 19B includes a measuring and reporting procedure 1960, and a D2D link and relay cellular link establishing procedure 1970. The measuring and reporting procedure 1960 is similar to a measuring and reporting procedure 1150 as described in FIGS. 11A and 11B, the D2D link and relay cellular link establishing procedure 1970 is similar to a D2D communication link and relay cellular communication link establishing procedure 1160 as described in FIGS. 11A and 11B, and a description thereof will be omitted herein.

Although FIGS. 19A and 19B illustrate a process in which an IUE performs link change to another cell in an environment that the IUE establishes a D2D link and a relay cellular link with an RUE which is within a service coverage of a TeNB due to degradation of quality of a corresponding link while performing relay communication through an RUE which is within a service coverage of an SeNB in an LTE mobile communication system according to an embodiment of the present disclosure, various changes could be made to FIGS. 19A and 19B. For example, although shown as a series of operations, various operations in FIGS. 19A and 19B could overlap, occur in parallel, occur in a different order, or occur multiple times.

A process in which an IUE performs link change to another cell in an environment that the IUE establishes a D2D link and a relay cellular link with an RUE which is within a service coverage of a TeNB due to degradation of quality of a corresponding link while performing relay communication through an RUE which is within a service coverage of an SeNB in an LTE mobile communication system according to an embodiment of the present disclosure has been described with reference to FIGS. 19A and 19B, and an inner structure of a UE in an LTE mobile communication system according to an embodiment of the present disclosure will be described with reference to FIG. 20.

Figure 20:
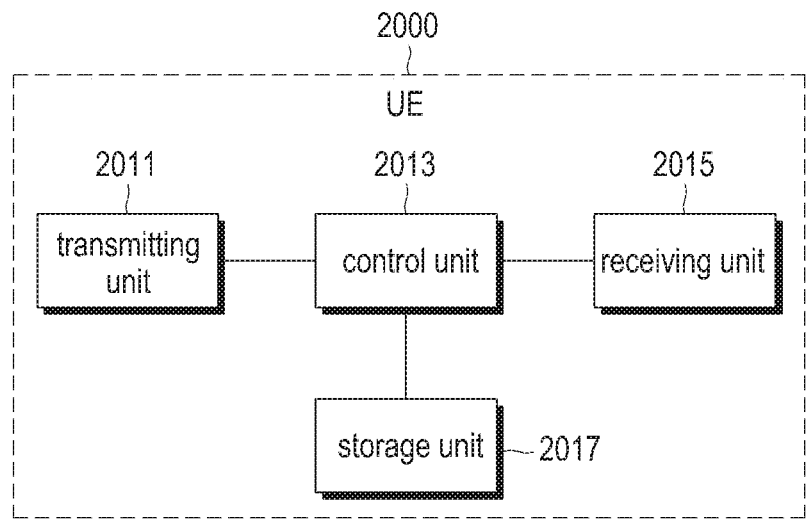
FIG. 20 schematically illustrates an inner structure of a UE in an LTE mobile communication system according to an embodiment of the present disclosure.

FIG. 20 schematically illustrates an inner structure of a UE in an LTE mobile communication system according to an embodiment of the present disclosure.

Referring to FIG. 20, a UE 2000 includes a transmitting unit 2011, a control unit 2013, a receiving unit 2015, and a storage unit 2017. Here, the UE 2000 may be an IUE or an RUE.

The control unit 2013 controls the overall operation of the UE 2000. More particularly, the control unit 2013 controls the UE 2000 to perform an operation for providing a service to an IUE in an LTE mobile communication system as described FIGS. 2 to 19b. The operation for providing the service to the IUE in the LTE mobile communication system has been described with reference to FIGS. 2 to 19b, and a description thereof will be omitted herein.

The transmitting unit 2011 transmits various messages to other devices or an eNB under a control of the control unit 2013. The various messages transmitted in the transmitting unit 2011 have been described in FIGS. 2 to 19b and a description thereof will be omitted herein.

The receiving unit 2015 receives various messages from other devices or an eNB under a control of the control unit 2013. The various messages received in the receiving unit 2015 have been described in FIGS. 2 to 19b and a description thereof will be omitted herein.

The storage unit 2017 stores a program related to an operation for the UE 2000 to provide a service to an IUE in an LTE mobile communication system, various data, and the like. The storage unit 2017 stores the various messages which are received by the receiving unit 2015 from the other devices or the eNB.

While the transmitting unit 2011, the control unit 2013, the receiving unit 2015, and the storage unit 2017 are described in the UE 2000 as separate units, it is to be understood that this is merely for convenience of description. In other words, two or more of the transmitting unit 2011, the control unit 2013, the receiving unit 2015, and the storage unit 2017 may be incorporated into a single unit.

An inner structure of a UE in an LTE mobile communication system according to an embodiment of the present disclosure has been described with reference to FIG. 20, and an inner structure of an eNB in an LTE mobile communication system according to an embodiment of the present disclosure will be described with reference to FIG. 21.

Figure 21:
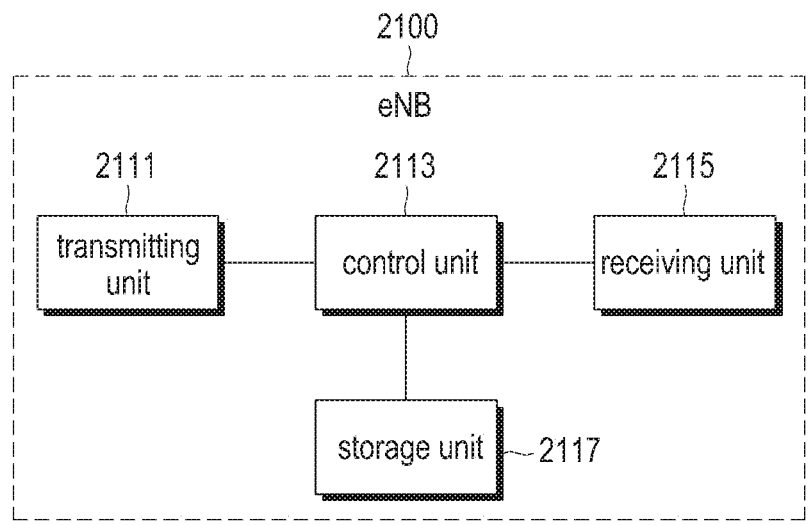
FIG. 21 schematically illustrates an inner structure of en eNB in an LTE mobile communication system according to an embodiment of the present disclosure.

FIG. 21 schematically illustrates an inner structure of en eNB in an LTE mobile communication system according to an embodiment of the present disclosure.

Referring to FIG. 21, an eNB 2100 includes a transmitting unit 2111, a control unit 2113, a receiving unit 2115, and a storage unit 2117. Here, the eNB 2100 may be an SeNB or a TeNB.

The control unit 2113 controls the overall operation of the eNB 2100. More particularly, the control unit 2113 controls the eNB 2100 to perform an operation for providing a service to an IUE in an LTE mobile communication system as described FIGS. 2 to 19b. The operation for the eNB 2100 to provide the service to the IUE in the LTE mobile communication system has been described with reference to FIGS. 2 to 19b, and a description thereof will be omitted herein.

The transmitting unit 2111 transmits various messages to an MIME or devices under a control of the control unit 2113. The various messages transmitted in the transmitting unit 2111 have been described in FIGS. 2 to 19b and a description thereof will be omitted herein.

The receiving unit 2115 receives various messages from an MME or devices under a control of the control unit 2113. The various messages received in the receiving unit 2115 have been described in FIGS. 2 to 19b and a description thereof will be omitted herein.

The storage unit 2117 stores a program related to an operation for the eNB 2100 to provide a service to an IUE in an LTE mobile communication system, various data, and the like. The storage unit 2117 stores the various messages which are received by the receiving unit 2115 from the MME or the devices.

While the transmitting unit 2111, the control unit 2113, the receiving unit 2115, and the storage unit 2117 are described in the eNB 2100 as separate units, it is to be understood that this is merely for convenience of description. In other words, two or more of the transmitting unit 2111, the control unit 2113, the receiving unit 2115, and the storage unit 2117 may be incorporated into a single unit.

An embodiment of the present disclosure enables to provide a D2D communication-based service for an IUE in a mobile communication system.

An embodiment of the present disclosure enables to provide a D2D communication-based service to an IUE which exists at outside of a service coverage of an eNB in a mobile communication system by establishing a link appropriate for a situation.

An embodiment of the present disclosure enables to support cellular communication for IUEs without additional device deployment and management in a mobile communication system thereby providing a D2D communication-based service.

Certain aspects of the present disclosure may also be embodied as computer readable code on a non-transitory computer readable recording medium. A non-transitory computer readable recording medium is any data storage device that can store data, which can be thereafter read by a computer system. Examples of the non-transitory computer readable recording medium include read only memory (ROM), random access memory (RAM), CD-ROMs, magnetic tapes, floppy disks, optical data storage devices, and carrier waves (such as data transmission through the Internet). The non-transitory computer readable recording medium can also be distributed over network coupled computer systems so that the computer readable code is stored and executed in a distributed fashion. In addition, functional programs, code, and code segments for accomplishing the present disclosure can be easily construed by programmers skilled in the art to which the present disclosure pertains.

It can be appreciated that a method and apparatus according to an embodiment of the present disclosure may be implemented by hardware, software and/or a combination thereof. The software may be stored in a non-volatile storage, for example, an erasable or re-writable ROM, a memory, for example, a RAM, a memory chip, a memory device, or a memory integrated circuit (IC), or an optically or magnetically recordable non-transitory machine-readable (e.g., computer-readable), storage medium (e.g., a compact disk (CD), a digital versatile disk (DVD), a magnetic disk, a magnetic tape, and/or the like). A method and apparatus according to an embodiment of the present disclosure may be implemented by a computer or a mobile terminal that includes a controller and a memory, and the memory may be an example of a non-transitory machine-readable (e.g., computer-readable), storage medium suitable to store a program or programs including instructions for implementing various embodiments of the present disclosure.

The present disclosure may include a program including code for implementing the apparatus and method as defined by the appended claims, and a non-transitory machine-readable (e.g., computer-readable), storage medium storing the program. The program may be electronically transferred via any media, such as communication signals, which are transmitted through wired and/or wireless connections, and the present disclosure may include their equivalents.

An apparatus according to an embodiment of the present disclosure may receive the program from a program providing device which is connected to the apparatus via a wire or a wireless and store the program. The program providing device may include a memory for storing instructions which instruct to perform a content protect method which has been already installed, information necessary for the content protect method, and the like, a communication unit for performing a wired or a wireless communication with a graphic processing device, and a controller for transmitting a related program to a transmitting/receiving device based on a request of the graphic processing device or automatically transmitting the related program to the transmitting/receiving device.

While the present disclosure has been shown and described with reference to various embodiments thereof, it will be understood by those skilled in the art that various changes in form and details may be made therein without departing from the spirit and scope of the present disclosure as defined by the appended claims and their equivalents.

The invention claimed is:

1. A method for providing a device-to-device (D2D) communication-based service for a first user equipment (UE) by a second UE in a cellular network, the method comprising:

establishing, by the second UE, a D2D link with the first UE;

receiving identification information of the first UE via the established D2D link from the first UE;

establishing a cellular connection for relaying the first UE between the second UE and a network node of the cellular network based on the identification information of the first UE received via the established D2D link; and relaying, by the second UE, data traffic for the first UE via the D2D link and the cellular connection, wherein the second UE is within a service coverage area of the network node.

2. The method of claim 1, wherein the identification information of the first UE comprises an internet protocol (IP) address allocated to the first UE.

3. The method of claim 1, wherein identification information of the second UE is used for identifying a message transmitted via the D2D link.

4. The method of claim 1, wherein the establishing of the cellular connection comprises transmitting, to a mobile management entity (MME), a message comprising the identification information, which is used to authenticate the first UE, via the network node.

5. The method of claim 4, wherein an indication indicating an authentication result of the first UE is transmitted from the MME to the network node.

6. A first user equipment (UE) for providing a device-to-device (D2D) communication-based service for a second UE, the first UE comprising:

a transceiver; and a processor configured to:
　establish a D2D link with the second UE,
　control the transceiver to receive identification information of the first UE via the established D2D link from the first UE, establish a cellular connection for relaying the second UE between the first UE and a network node of the cellular network based on the identification information of the second UE received via the established D2D link, and
　relay data traffic for the second UE via the D2D link and the cellular connection, wherein the first UE is within a service coverage area of the network node.

7. The first UE of claim 6, wherein the identification information of the second UE comprises an internet protocol (IP) address allocated to the first UE.

8. The first UE of claim 6, wherein identification information of the first UE is used for identifying a message transmitted via the D2D link.

9. The first UE of claim 6, wherein the processor is further configured to transmit, to a mobile management entity (MME), a message comprising the identification information, which is used to authenticate the first UE, via the network node.

10. The first UE of claim 9, wherein an indication indicating an authentication result of the second UE is transmitted from the MME to the network node.

11. A method for providing a device-to-device (D2D) communication-based service for a first user equipment (UE), the method comprising:
    establishing, by the first UE, a D2D link with a second UE which is within a service coverage area of a network node;
    transmitting identification information of the first UE via the established D2D link to the second UE; and
    receiving, by the first UE, data traffic for the first UE via the D2D link and a cellular connection for the first UE,
    wherein the cellular connection for relaying the first UE is established between the second UE and the network node based on identification information of the first UE received via the D2D link, and
    wherein the data traffic for the first UE is relayed by the second UE via the D2D link and the cellular connection.

12. The method of claim 11, wherein the identification information of the first UE comprises an internet protocol (IP) address allocated to the first UE.

13. The method of claim 11, wherein identification information of the second UE is used for identifying a message transmitted via the D2D link.

14. The method of claim 11, wherein a message comprising the identification information, which is used to authenticate the first UE, is transmitted to a mobile management entity (MME) via the second node and the network node.

15. The method of claim 14, wherein an indication indicating an authentication result of the first UE is transmitted from the MME to the network node.

16. A first user equipment (UE) for providing a device-to-device (D2D) communication-based service for the first UE, the first UE comprising:
    a transceiver; and
    a processor configured to:
        establish, by the first UE, a D2D link with a second UE which is within a service coverage area of a network node,
        control the transceiver to transmit identification information of the first UE via the established D2D link to the second UE, and
        receive data traffic for the first UE via the D2D link and a cellular connection for the first UE,
    wherein the cellular connection for relaying the first UE is established between the second UE and the network node based on identification information of the first UE received via the D2D link, and
    wherein the data traffic for the first UE is relayed by the second UE via the D2D link and the cellular connection.

17. The first UE of claim 16, wherein the identification information of the first UE comprises an internet protocol (IP) address allocated to the first UE.

18. The first UE of claim 16, wherein identification information of the second UE is used for identifying a message transmitted via the D2D link.

19. The first UE of claim 16,
    wherein the processor is further configured to transmit, to a mobile management entity (MME), a message comprising the identification information, which is used to authenticate the first UE, via the second node and the network node, and
    wherein the identification information, which is used to authenticate the first UE, is transmitted to the MME.

20. The first UE of claim 19, wherein an indication indicating an authentication result of the first UE is transmitted from the MME to the network node.

* * * * *